US012415437B2

(12) United States Patent
Albanna et al.

(10) Patent No.: US 12,415,437 B2
(45) Date of Patent: Sep. 16, 2025

(54) ENERGY MANAGEMENT SYSTEM WITH MACHINE LEARNING

(71) Applicant: Ahmad Albanna, Rochester Hills, MI (US)

(72) Inventors: Ahmad Z. Albanna, Rochester Hills, MI (US); Krzysztof Klesyk, Novi, MI (US); Yan Zhou, Canton, MI (US); Jarold A. Gonzalez Sosa, Southfield, MI (US); Richard J. Hampo, Ann Arbor, MI (US)

(73) Assignee: Ahmad Albanna, Rochester Hills, MI (US)

(*) Notice: Subject to any disclaimer, the term of this patent is extended or adjusted under 35 U.S.C. 154(b) by 0 days.

(21) Appl. No.: 18/215,764

(22) Filed: Jun. 28, 2023

(65) Prior Publication Data

US 2023/0402839 A1   Dec. 14, 2023

Related U.S. Application Data

(63) Continuation of application No. 18/209,568, filed on Jun. 14, 2023.
(Continued)

(51) Int. Cl.
*B60L 53/63* (2019.01)
*B60L 53/10* (2019.01)
(Continued)

(52) U.S. Cl.
CPC ............. *B60L 53/63* (2019.02); *B60L 53/11* (2019.02); *B60L 53/62* (2019.02); *B60L 53/67* (2019.02);
(Continued)

(58) Field of Classification Search
CPC .......... B60L 53/63; B60L 53/67; B60L 53/68; B60L 55/00; B60L 53/62; B60L 53/11;
(Continued)

(56) References Cited

U.S. PATENT DOCUMENTS

| 10,913,374 B2 | 2/2021 | Son |
| 11,241,975 B2 | 2/2022 | Patel |

(Continued)

FOREIGN PATENT DOCUMENTS

| KR | 102361409 | 2/2022 |
| WO | 2013039753 A1 | 3/2013 |
| WO | 2017151057 A1 | 9/2017 |

OTHER PUBLICATIONS

Invitation to Pay Additional Fees issued in App. No. PCT/US2023/025306, mailing date Oct. 18, 2023, 19 pages.
(Continued)

*Primary Examiner* — Carlos Amaya
(74) *Attorney, Agent, or Firm* — Butzel Long

(57) ABSTRACT

An energy management system including a universal energy flow manager that has a housing, an energy storage device disposed in the housing, a power electronics module disposed in the housing and adapted to convert and manage power and a connections interface. It also includes distribution and communications module with a HVDC Bus (High-Voltage Direct Current Bus) having variable power limits that powers an entire load requirement of one or more coupled electrical loads up to a defined power limit determined by an aggregation of power from one or more coupled energy sources. The one or more coupled electrical loads and the one or more coupled energy sources are external to the universal energy flow manager and connect to the HVDC Bus through the connections interface.

16 Claims, 20 Drawing Sheets

Related U.S. Application Data

(60) Provisional application No. 63/352,189, filed on Jun. 14, 2022.

(51) Int. Cl.

| | | |
|---|---|---|
| B60L 53/51 | (2019.01) | |
| B60L 53/52 | (2019.01) | |
| B60L 53/62 | (2019.01) | |
| B60L 53/67 | (2019.01) | |
| B60L 53/68 | (2019.01) | |
| B60L 55/00 | (2019.01) | |
| G06N 3/044 | (2023.01) | |
| H02J 1/08 | (2006.01) | |
| H02J 3/00 | (2006.01) | |
| H02J 3/32 | (2006.01) | |

(52) U.S. Cl.
CPC ............... B60L 53/68 (2019.02); B60L 55/00 (2019.02); G06N 3/044 (2023.01); H02J 1/084 (2020.01); H02J 3/007 (2020.01); H02J 3/322 (2020.01); *B60L 53/51* (2019.02); *B60L 53/52* (2019.02); *H02J 2203/10* (2020.01); *H02J 2300/24* (2020.01); *H02J 2300/28* (2020.01); *H02J 2300/30* (2020.01); *H02J 2310/12* (2020.01)

(58) Field of Classification Search
CPC . B60L 53/51; B60L 53/52; H02J 3/322; H02J 3/007; H02J 1/084; H02J 2300/28; H02J 2300/24; H02J 2310/12; H02J 2203/10; H02J 2300/30; G06N 3/044
See application file for complete search history.

(56) References Cited

U.S. PATENT DOCUMENTS

| | | |
|---|---|---|
| 2011/0025267 A1 | 2/2011 | Kamen |
| 2011/0276194 A1 | 11/2011 | Emalfarb |
| 2012/0249065 A1 | 10/2012 | Bissonette |
| 2013/0013123 A1 | 1/2013 | Ozaki |
| 2013/0147272 A1* | 6/2013 | Johnson ............ H02J 7/0068 307/29 |
| 2014/0316939 A1 | 10/2014 | Uyeki |
| 2017/0194794 A1 | 7/2017 | Katcha |
| 2019/0168630 A1 | 6/2019 | Mrlik |
| 2020/0023747 A1 | 1/2020 | Logvinov |
| 2022/0080852 A1 | 3/2022 | Yu |
| 2022/0097547 A1 | 3/2022 | Ibrahim |
| 2022/0149745 A1 | 5/2022 | Ibrahim |
| 2023/0347778 A1 | 11/2023 | Shahriar |

OTHER PUBLICATIONS

International Preliminary Report on Patentability issued in App. No. PCT/US2023/025306, mailing date Dec. 26, 2024. 15 pages.
International Search Report and Written Opinion issued in App. No. PCT/US2023/025306, mailing date Dec. 12, 2023, 25 pages.

* cited by examiner

ENERGY MANAGEMENT SYSTEM WITH MACHINE LEARNING

TECHNICAL FIELD

The present disclosure relates generally to an energy management system. More particularly, the present disclosure relates to modular and scalable energy management system with integrated electronics to supply and manage a plurality of loads concurrently.

BACKGROUND

Electric automobiles are becoming increasingly popular as more people get interested in using renewable and ecologically friendly energy resources such as solar panels. In most circumstances, such technologies may be connected to and function with the power grid or residential electrical wiring. Furthermore, in regions with high energy costs, consumers may find it more appealing to use an electric vehicle and/or renewable energy to control costs.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Figure 1:
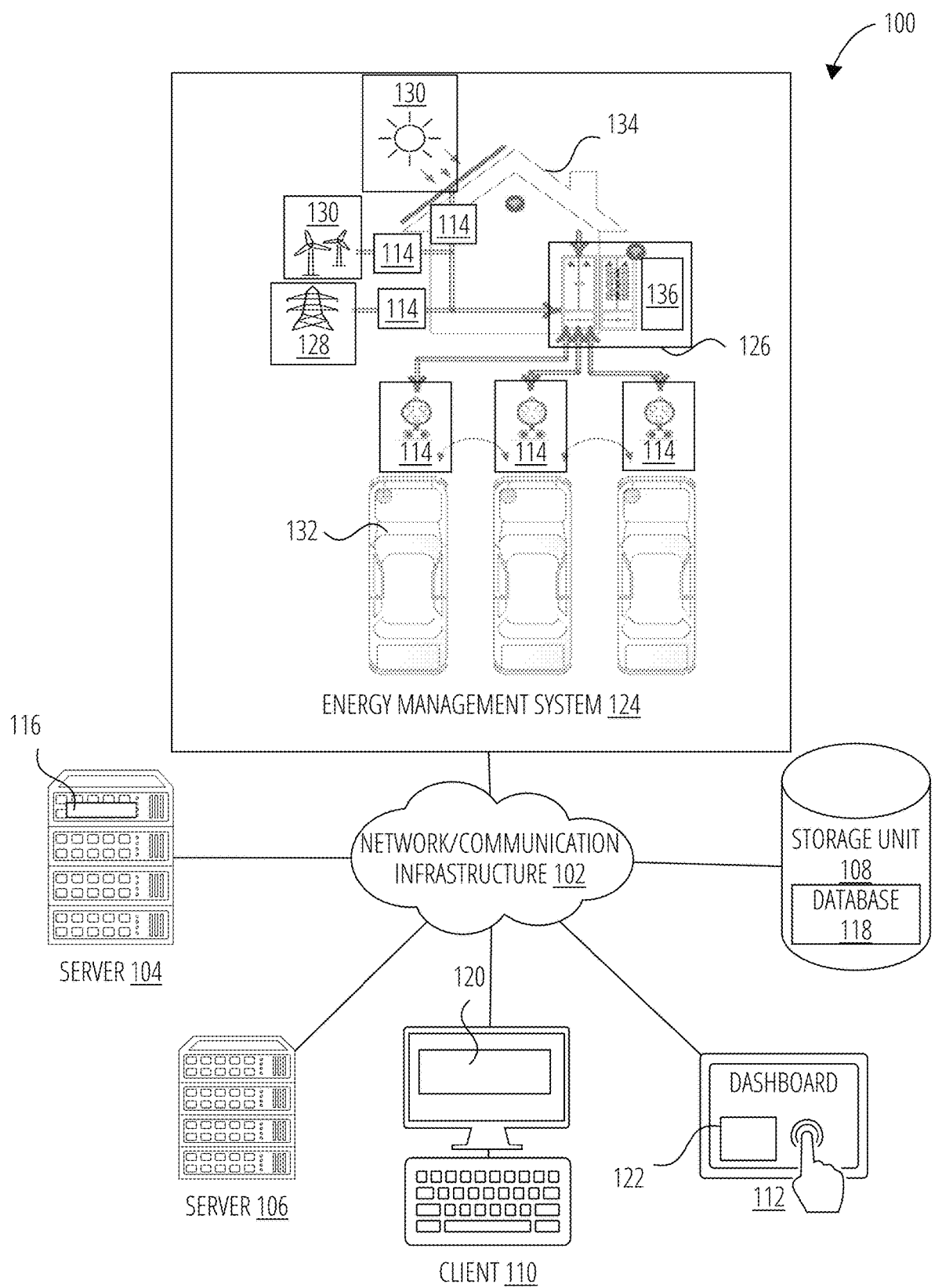
FIG. 1 depicts a block diagram of an energy management environment in which illustrative embodiments may be implemented.

The illustrative embodiments recognize that electric vehicles and energy sources such as solar panels are becoming increasingly popular as people become interested in using renewable and ecologically friendly energy sources. In some circumstances, such technologies may be connected to and may function with the power grid or residential electrical wiring. Furthermore, in regions with variable electricity pricing for different times of the day, consumers may find it more appealing to use an electric vehicle and/or solar energy to control energy use and production to benefit from lower energy tariffs.

The illustrative embodiments recognize that, solar panels, for example, may have distinct advantages as an energy source that produces DC electricity while emitting no pollution or emissions. An inverter may be employed to use this energy with domestic appliances. The illustrative embodiments recognize that since solar energy production may be unavailable at night, it may be desired to store energy for later use, for example in a battery or other storage system. The illustrative embodiments recognize that it may be prudent to manage energy storage and consumption with automatically and/or in an intelligent way.

The illustrative embodiments further recognize that electric vehicles may draw large amounts of power which may not be readily available in home energy systems. For example, level 3 power consumption (for example, greater than 12 kW, or greater than 15 kW) by electric vehicles connected to a home energy system may utilize all available grid power in a home energy system or may cause the entire power budget of an electrical panel to be surpassed. This may also be true for other high power electrical appliances such as air conditioners. Even further, supplying a plurality of electric vehicles and high-power electrical appliances with all their power requirements may be significantly difficult, if not impossible to achieve in a home setting. The illustrative embodiments recognize that as a result, users may have to prioritize energy use and stagger charging times to cope with these limitations.

The illustrative embodiments may disclose a universal, modular, and scalable energy management system with integrated electronics to concurrently supply and manage the entire load requirements of multiple connected loads in a home or other setting. The illustrative embodiments may disclose optimizing energy harvesting and High Voltage Direct Current (HVDC) distribution for various applications which may include residential and/or automotive applications. The energy management system may automatically detect and configure its operating parameters when interfacing to multiple loads and sources in efforts of reducing dependence on utility service, avoiding capacity limitations, and reducing downtime cost. The energy management system may further introduce DC (Direct Current) Fast Charging into residential markets and promote the development of smart homes. Not only may electric vehicles or high-power electrical appliances be DC Fast Charged in home energy systems, a plurality of electric vehicles and high-power electrical appliances may also be DC Fast Charged concurrently. The illustrative embodiments may disclose a universal energy flow manager that may receive any number of energy sources for routing to any number of loads. The ability to obtain large amounts of power may only be limited by energy sources that are available to be connected. This may increase customer adoption of renewable energy sources by providing less-expensive option as well as by eliminating complexity resulting from different manufacturers, component specifications, and installation. The energy management system may thus provide smart home safety measures and automation, energy cycling and resale, backup energy optimization, prolonged supply durations, convenience and self-installation.

In an aspect, the energy management system may comprise a universal energy flow manager comprising a housing, an energy storage device disposed in the housing, a power electronics module disposed in the housing and configured to convert and manage power and a connections interface. The universal energy flow manager may also comprise a distribution and communications module comprising at least a HVDC Bus (High-Voltage Direct Current Bus) having variable power limits, configured to power an entire load requirement of one or more coupled electrical loads up to a defined power limit determined by an aggregation of power from one or more coupled energy sources. This aggregation may be achieved, for example, by the parallel connection of all low voltage application specific hardware (ASH) for a low voltage DC Bus or the parallel connection of all high voltage application specific hardware for the high voltage DC Bus, as discussed hereinafter. The one or more coupled electrical loads and the one or more coupled energy sources may be external to the universal energy flow manager and may connect to the HVDC Bus through the connections interface. By configuring the energy flow manager to power an entire load requirement of one or more coupled electrical loads up to a defined power limit determined by an aggregation of power from any number of coupled energy sources and types, the energy flow manager may be "universal" to provide power to any type of connected load, from any type of connected source regardless of load or source architecture. Thus, the energy sources may not be required to have output energy/power specifications that match that of the universal energy flow manager.

In another aspect, EV-to-EV DC (electric vehicle to electric vehicle Direct Current) Fast Charging may be provided. Further, multiple EVs may be concurrently charged using energy time-division multiplexing. Herein, routing of energy/power from an energy source to an EV load over a common connection may be performed by allocating a full transmission operation to one source and/or one EV at a time, for a certain duration of time. This may be performed to enable power transfer between a source-load pair without needed a dedicated connection for each pair.

In another aspect, a portable energy bank may be provided wherein DC Fast charging for low voltage DC equipment and emergency/roadside assistance capability may also be available via the on-board energy storage device of the energy flow manager.

In another aspect, an intelligent proposal of one or more power delivery proposal operations may be disclosed. The intelligent proposal may comprise the steps of receiving an energy demand state of one or more coupled electrical loads coupled to a universal energy flow manager via a load application specific hardware (load ASH), the energy demand state being indicative of a desired amount of energy needed by the one or more coupled electrical loads in an energy management environment. The intelligent proposal may further comprise receiving an available energy state of one or more coupled energy sources coupled to the universal energy flow manager via a source application specific hardware (source ASH), the available energy state being indicative of an available amount of energy from the one ore one or more coupled energy sources in the energy management environment. Input data may be generated using at least the energy demand and available energy states for use by a power delivery module and one or more features may be extracted from the input data, the one or more features being representative of a characteristic of a request for a power delivery proposal operation. At least one power delivery proposal may be proposed by the power delivery module and implemented for the one or more coupled electrical loads. The power delivery module may operate a machine learning engine.

The architecture and manner of managing energy sources and loads is unavailable in the presently available methods in the technological field of endeavor pertaining to battery energy storage systems and electric vehicles. The term electric vehicle is used herein to collectively vehicles and appliances such as motor vehicles, railed vehicles, watercraft, home appliances and aircraft that are configured to utilize rechargeable electric batteries as their main source of energy to power their component systems or for propulsion. The illustrative embodiments are also described with respect to certain types of data, functions, algorithms, equations, model configurations, locations of embodiments, additional data, devices, data processing systems, environments, components, and applications only as examples. Any specific manifestations of these and other similar artifacts are not intended to be limiting to the disclosure. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the disclosure, either locally at a data processing system or over a data network, within the scope of the disclosure. Where an embodiment is described using a client device, any type of data storage device suitable for use with the client device may provide the data to such embodiment, either locally at the client device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the disclosure within the scope of the disclosure. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

With reference to the figures and in particular with reference to FIG. 1, this figure is an example diagram of an energy management environment 100 in which illustrative embodiments may be implemented. FIG. 1 is only an example and is not intended to assert or imply any limitation with regard to the environments in which different embodiments may be implemented. A particular implementation may make many modifications to the depicted environments based on the following description.

Energy management environment 100 is a network of energy management systems comprising a universal energy flow manager 126 having an application 136. The energy management environment 100 may also comprise computers in which the illustrative embodiments may be implemented, and energy sources such as a power grid 128, renewable energy sources 130, and electric vehicles 132. The energy management environment 100 may also comprise electrical loads (including, for example, other electric vehicles 132, and home appliances) and network/communication infrastructure 102. Network/communication infrastructure 102 may be the medium used to provide communications links between various devices, databases and computers connected together within energy management environment 100. Network/communication infrastructure 102 may include connections such as CAN (Controller Area Network) Bus connections, PLC (Programmable logic controller), wires, wireless communication links, or fiber optic cables.

Clients or servers are only example roles of certain data processing systems connected to network/communication infrastructure 102 and are not intended to exclude other configurations or roles for these data processing systems. Server 104 and server 106 couple to network/communication infrastructure 102 along with storage unit 108 comprising database 118. Software applications may execute on any computer in energy management environment 100. Client 110 and dashboard 112 are also coupled to network/communication infrastructure 102. Client 110 may be a remote computer with a display or may even be a mobile device configured with an application to send or receive information, such as to receive a charge condition of the energy management system 124 or components thereof. Dashboard 112 may be located in the home 134 and may be configured to send or receive any of the information discussed herein. A data processing system, such as server 104 or server 106, or clients (client 110, dashboard 112) may contain data and may have software applications or software tools executing thereon.

Only as an example, and without implying any limitation to such architecture, FIG. 1 depicts certain components that are usable in an example implementation of an embodiment. For example, servers and clients are only examples and do not to imply a limitation to a client-server architecture. As another example, an embodiment can be distributed across several data processing systems and a data network as shown, whereas another embodiment can be implemented on a single data processing system within the scope of the illustrative embodiments. Data processing systems (server 104, server 106, client 110, dashboard 112) also represent example nodes in a cluster, partitions, and other configurations suitable for implementing an embodiment.

The energy management system 124 may comprise one or more application specific hardware 114 that may electrically couple an energy source or electrical load to a universal energy flow manager 126. The architecture may allow homes to not have to entirely depend on utility to supply all EV and other load demand via level 2 AC charges. Due to the design of the universal energy flow manager and connections interface, as discussed herein, a home 134 may be provided with the ability to set charging targets to multiple EVs. This may be achieved concurrently or by setting a priority level for different loads. The power available may be limited by the energy sources available rather than by an existing specifications of home circuit. The energy management system 124 may harvest energy from, for example, the utility grid, energy storage, solar photovoltaic panels, wind energy, fuel cells and EVs in garage. In an aspect, when available energy is to be judiciously used, the system may monitor home loads and redirect maximum AC power to charge an EV having a highest priority. Further, all EVs at home may have access to DC Fast Charging rather than swapping cars to be close to one-port DC charger. Even further, home energy may be scalable wherein by connecting another system in parallel, power may be doubled.

Application 136, Client application 120, dashboard application 122, or any other application such as server application 116 may implement an embodiment described herein. Any of the applications may use data from the universal energy flow manager 126, energy sources or loads to compute power or energy requirements. The applications may also obtain data from storage unit 108 for predictive analytics. The applications can also execute in any of data processing systems (server 104 or server 106, client 110, dashboard 112).

Server 104, server 106, storage unit 108, client 110, dashboard 112, may couple to network/communication infrastructure 102 using wired connections, wireless communication protocols, or other suitable data connectivity.

In the depicted example, server 104 may provide data, such as boot files, operating system images, and applications to client 110, and dashboard 112. Client 110, and dashboard 112 may be clients to server 104 in this example. Client 110 and dashboard 112 or some combination thereof, may include their own data, boot files, operating system images, and applications. energy management environment 100 may include additional servers, clients, and other devices that are not shown.

Server 106 may include a search engine configured to search information, such as weather condition, grid consumption data, power outage historical data, total energy available from an energy source, a required charging duration, user preferences, user feedback, or otherwise other energy management system data, automatically or in response to a request from an operator for power delivery as described herein with respect to various embodiments.

In the depicted example, network/communication infrastructure 102 may include the Internet. Network/communication infrastructure 102 may represent a collection of networks and gateways that use the Transmission Control Protocol/Internet Protocol (TCP/IP), Controller Area Network BUS (CAN bus), local area network (LAN), wide area network (WAN) and/or other protocols to communicate with one another. At the heart of the Internet is a backbone of data communication links between major nodes or host computers, including thousands of commercial, residential, educational, and other computer systems that route data and messages. Of course, energy management environment 100 also may be implemented as a number of different types of networks, such as for example, an intranet. FIG. 1 is intended as an example, and not as an architectural limitation for the different illustrative embodiments.

Among other uses, energy management environment 100 may be used for implementing a client-server environment in which the illustrative embodiments may be implemented. A client-server environment enables software applications and data to be distributed across a network such that an application functions by using the interactivity between a client data processing system and a server data processing system. Energy management environment 100 may also employ a service-oriented architecture where interoperable software components distributed across a network may be packaged together as coherent business applications. Energy management environment 100 may also employ a cloud computing model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service.

Figure 2:
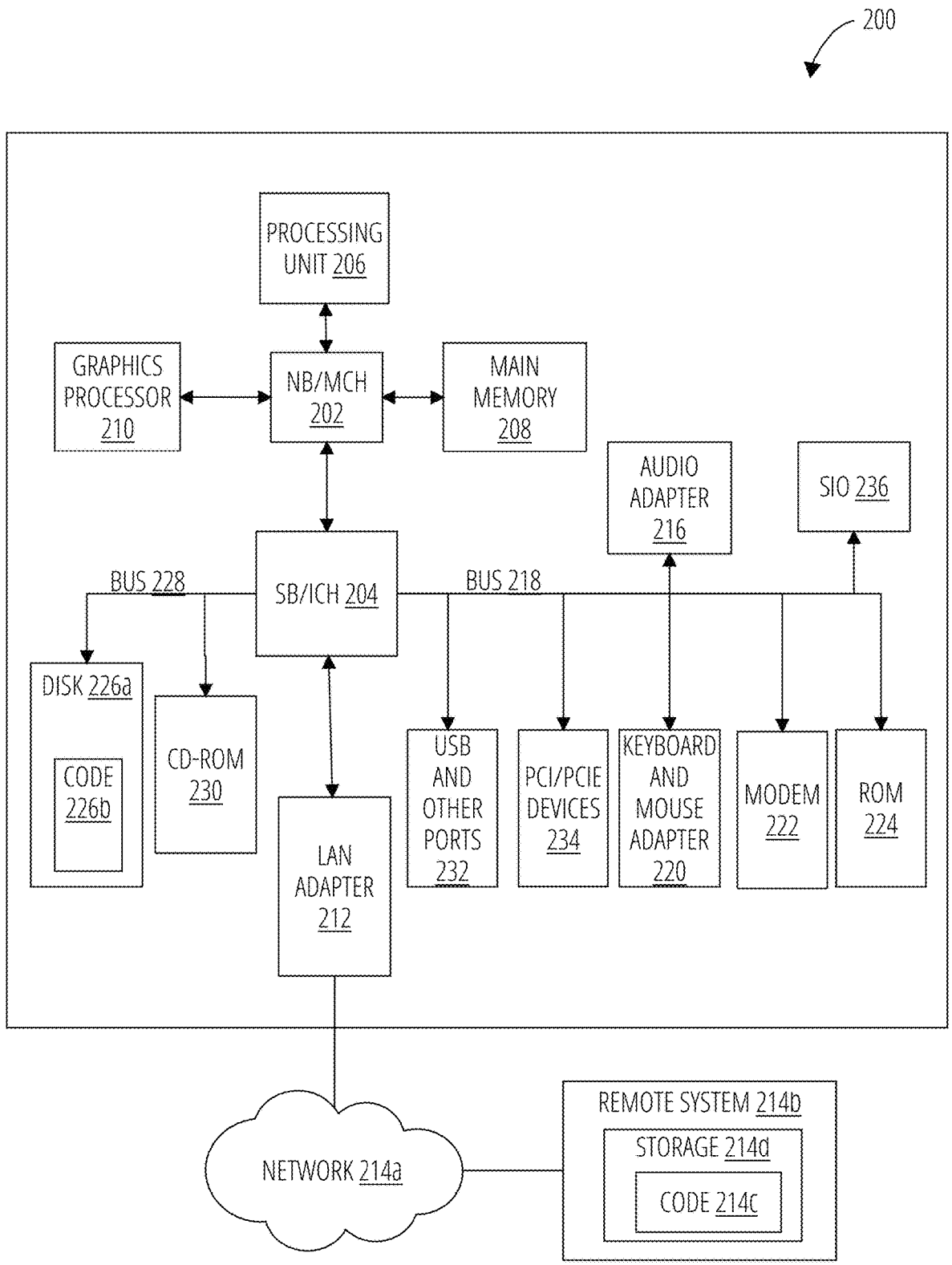
FIG. 2 depicts a block diagram of a data processing system in which illustrative embodiments may be implemented.

With reference to FIG. 2, this figure depicts a block diagram of a data processing system in which illustrative embodiments may be implemented. Data processing system 200 is an example of a computer, such client 110, dashboard 112, s server 104, or server 106, in FIG. 1, or another type of device in which computer usable program code or instructions implementing the processes may be located for the illustrative embodiments.

Data processing system 200 is described as a computer only as an example, without being limited thereto. Implementations in the form of other devices, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to North Bridge and memory controller hub (NB/MCH) 202 through an accelerated graphics port (AGP) in certain implementations.

In the depicted example, local area network (LAN) adapter 212 is coupled to South Bridge and input/output (I/O) controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and input/output (I/O) controller hub (SB/ICH) 204 through bus 218. Hard disk drive (HDD) or solid-state drive (SSD) 226a and CD-ROM 230 are coupled to South Bridge and input/output (I/O) controller hub (SB/ICH) 204 through bus 228. PCI/PCIe devices 234 may include, for example, Ethernet adapters, add-in cards, and PC cards for notebook computers. PCI uses a card bus controller, while PCIe does not. Read only memory (ROM) 224 may be, for example, a flash binary input/output system (BIOS). Hard disk drive (HDD) or solid-state drive (SSD) 226a and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and input/output (I/O) controller hub (SB/ICH) 204 through bus 218.

Memories, such as main memory 208, read only memory (ROM) 224, or flash memory (not shown), are some examples of computer usable storage devices. Hard disk drive (HDD) or solid-state drive (SSD) 226a, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 116 and client application 120 are located on storage devices, such as in the form of codes 226b on Hard disk drive (HDD) or solid-state drive (SSD) 226a, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory (ROM) 224, or in one or more peripheral devices.

Furthermore, in one case, code 226b may be downloaded over network 214a from remote system 214b, where similar code 214c is stored on a storage device 214d in another case, code 226b may be downloaded over network 214a to remote system 214b, where downloaded code 214c is stored on a storage device 214d.

The hardware in FIG. 1 and FIG. 2 may vary depending on the implementation. Other internal hardware or peripheral devices, such as flash memory, equivalent non-volatile memory, or optical disk drives and the like, may be used in addition to or in place of the hardware depicted in FIG. 1 and FIG. 2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub (NB/MCH) 202. A processing unit may include one or more processors or CPUs.

The depicted examples in FIG. 1 and FIG. 2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and Hard disk drive (HDD) or solid-state drive (SSD) 226a is manifested as a virtualized instance of all or some portion of Hard disk drive (HDD) or solid-state drive (SSD) 226a that may be available in the host data processing system. The host data processing system in such cases is represented by data processing system 200.

Energy Management System

Figure 3:
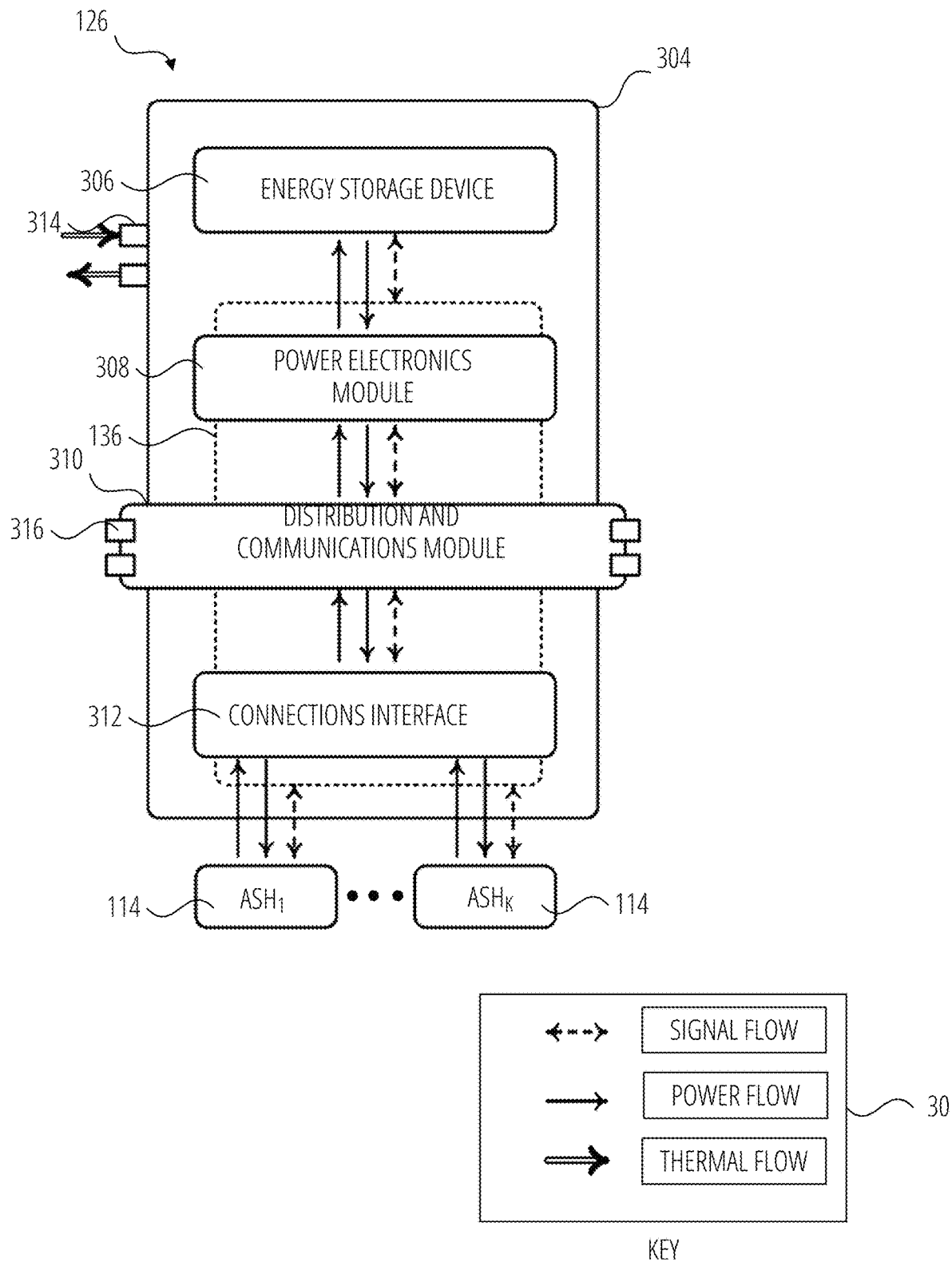
FIG. 3 depicts a block diagram a universal energy flow manager in which illustrative embodiments may be implemented.
Figure 4A:
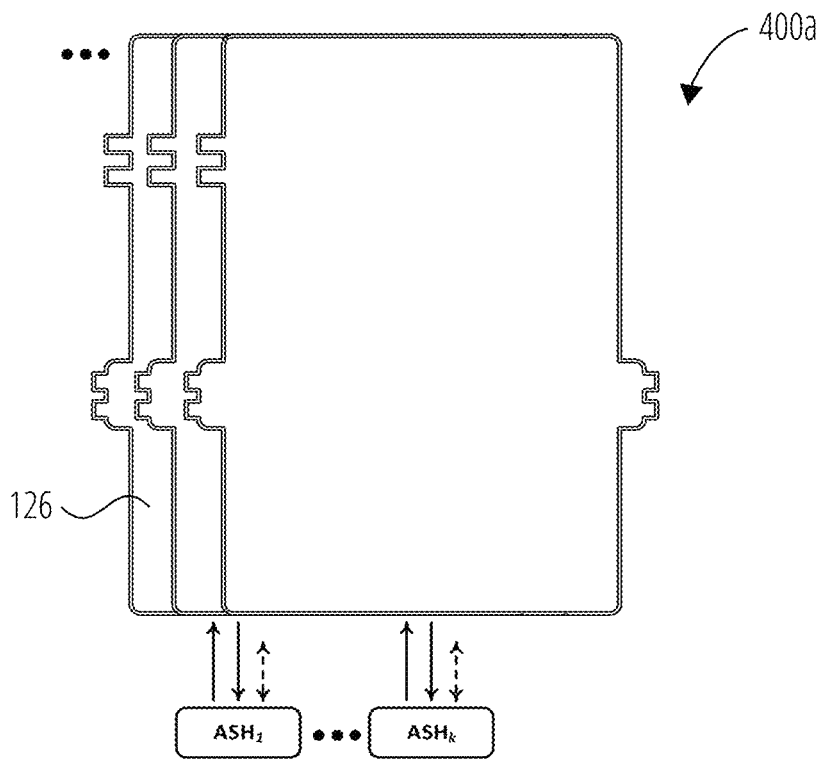
FIG. 4A depicts a sketch of a parallel configuration of universal energy flow managers in which illustrative embodiments may be implemented.
Figure 4B:
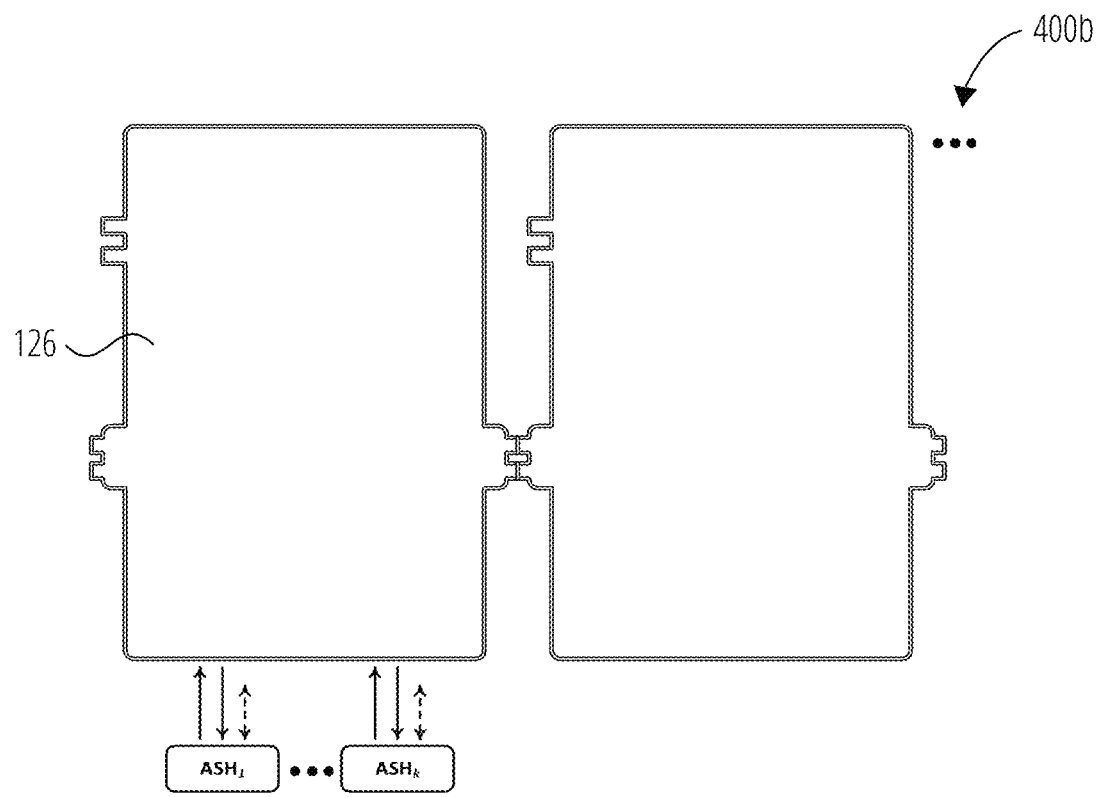
FIG. 4B depicts a sketch of a series configuration of universal energy flow managers in which illustrative embodiments may be implemented.

Turning now to FIG. 3, a universal energy flow manager is shown. The universal energy flow manager 126 may be a part of the energy management system 124 and may comprise a housing 304, an energy storage device 306 (battery) disposed in the housing and configured to provide on-board energy, a power electronics module 308 disposed in the housing and configured to convert and manage power, a connections interface 312 configured to receive external application specific hardware 114, and a distribution and communications module 310 that comprises at least a HVDC Bus (High-Voltage Direct Current Bus) having variable power limits and configured to power an entire load requirement of one or more coupled electrical loads up to a defined power limit determined by an aggregation of power from one or more coupled energy sources. The one or more coupled electrical loads and the one or more coupled energy sources are external to the universal energy flow manager and connect to the HVDC Bus or LVDC Bus through respective application specific hardware 114 and the connections interface 312. A plurality of energy sources and loads may be connected to a universal energy flow manager and a plurality of universal energy flow managers 126 may be connected in parallel as shown in FIG. 4A or in series as shown in FIG. 4B. It then follows that; various combinations may be obtained to supply an entire load requirement.

The universal energy flow manager 126 may also comprise an application 136 comprising control software configured to communicate with and/or control external devices that supply or receive power from the energy flow manager.

The universal energy flow manager 126 may also comprise a thermal management component 314 configured to regulate a temperature of the universal energy flow manager 126 by heat exchange through one or more heat exchange processes including, for example, a gas or liquid medium.

Figure 5:
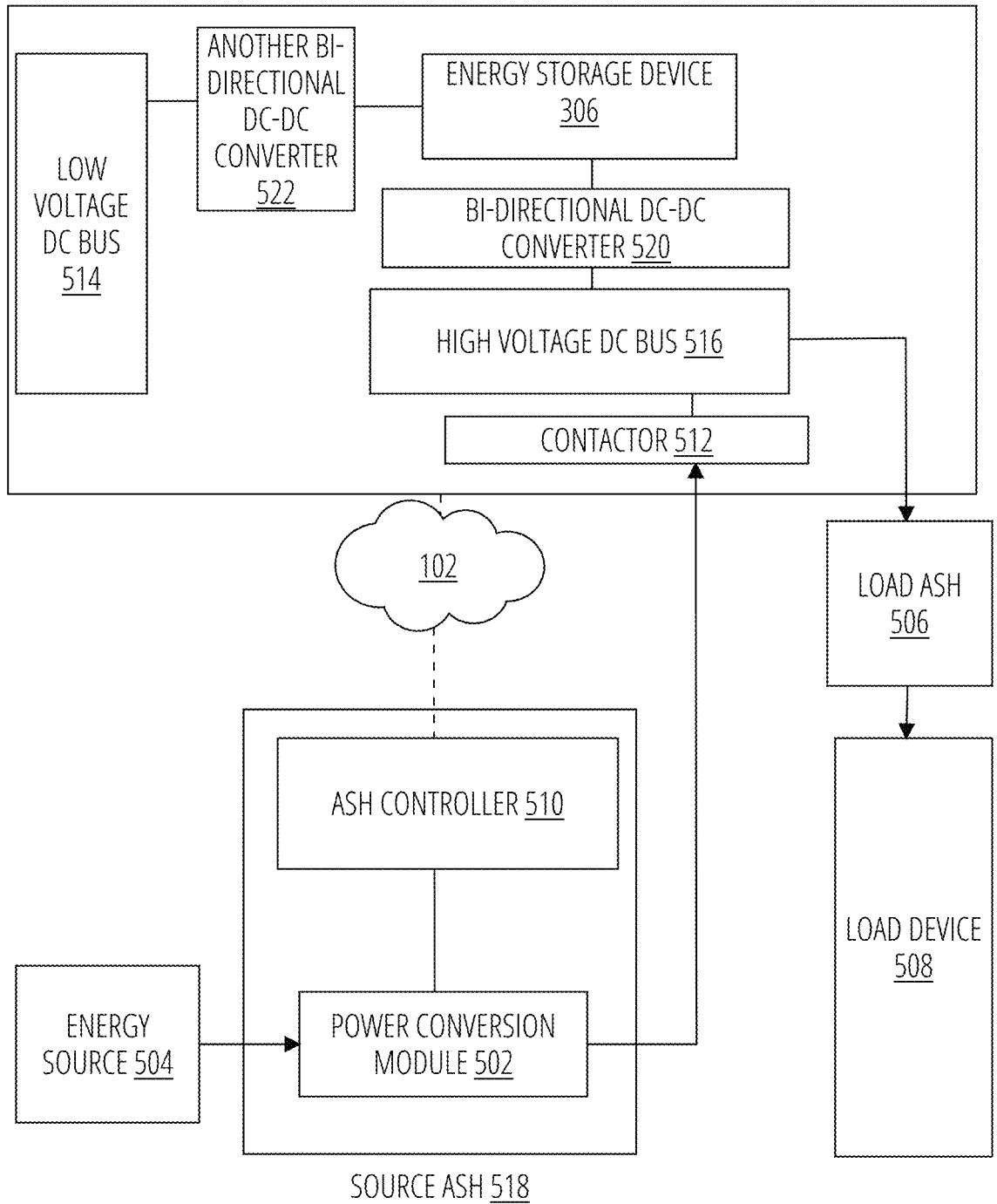
FIG. 5 depicts a block diagram of an application specific hardware environment in which illustrative embodiments may be implemented.

The power electronics module 308 may comprise components for bi-directional high voltage conversion, bi-directional low voltage conversion and electronics for energy storage management. As shown in FIG. 5, a DC-DC converter such as the bi-directional DC-DC converter 520 may be disposed between the HVDC Bus and the energy storage device and configured to convert power between the energy storage device and the HVDC Bus. Herein, for example, a 48V output of the energy storage device may be converted into a 400-900V input for the HVDC Bus and vice versa. Another DC-DC converter such as another bi-directional DC-DC converter 522 may be disposed between a LVDC Bus 514 (Low-Voltage Direct Current Bus) and the energy storage device 306 and configured to convert power between the energy storage device and the LVDC Bus. Thus, a 48V output of the energy storage device may be converted to a 12-48V input for the LVDC Bus and vice-versa. This may allow stack/energy flow manager balancing when charging or discharging and may further serve as an additional low voltage power source for external loads. The energy storage device 306 may be a backup storage and may be used to charge a vehicle. Further, its presence in the universal energy flow manager 126 may allow the universal energy flow manager 126 to be used as single or multiple vehicle 12V or 24V or 48V battery for long term storage. The power electronics module may comprise one or more controllers which may monitor a state of the HVDC Bus and LVDC Bus. The power electronics module may further rapidly adjust the HVDC Bus voltage level to match a particular EV. By virtue of single or a plurality of interleaved converters, flexible power limits that may be adjustable to allow a full range of power from hundreds of mW to full power may be designed for improved load efficiency. The flexible power limits may be made possible by the ability to automatically couple a plurality of ASHs together as well as an ability to automatically detect and adjust a time-division energy multiplexing operation to manage power flow and conversion as discussed herein. Integrated protection for overvoltage, undervoltage, over temperature and under temperature may also be implemented. To ensure proper isolation, the energy management system may perform automatic self-checking by applying safe voltage level output line to ensure proper isolation. Continuous monitoring of HVDC signals may be performed with reference to earth ground to flag fast or slow drifts. Further, sensors may be integrated into the energy flow manager to provide automatic warnings active load control during hazardous conditions. These may include shutting down a main water control valve, shutting down individual circuit breakers, purging air control during carbon monoxide detection or during indoor air quality warning, sensing air quality, detecting smoke and fire, and measuring temperature on battery stacks, PCBs, and connectors. Further the HVDC may be run with a frequency flyback converter.

The power electronics may further include a battery management system (BMS) configured to perform active measurements and cell balancing, charge and discharge control, temperature measurement, and safety logic with redundant sensing and supplies.

In an aspect, the distribution and communications module 310 may further comprise components for DC distribution with flexible power limits, a communication hub for energy management system 124 comprising a master digital controller (not shown), components for voltage and current measurement, monitoring, and protection, and a disconnect unit (contactors) with faulted contactor detection configured to disconnect the distribution and communications module 310 from an application specific hardware 114. The distribution and communications module 310 may also comprise components for DC bus pre-charging and control electronics for full system integration. For example, a pre-charge circuit may be controlled by a controller of the HVDC Bus to match the voltage on both sides of contactors 512 prior to closing of the contactors 512. Further, with regards to components for voltage and current measurement, the universal energy flow manager receive information about the voltage or power needed in an ASH via communication with the ASH. For example, in case of an EV ASH, the EV may command current and voltage from a charger, which may be transmitted to the ASH and then to the energy flow manager. In other cases, the energy flow manager may use internal measurements to ensure operation does not exceed design ratings.

The housing 304 may comprise a structure that may enclose other components of the universal energy flow manager 126. The housing may have HVIL (high-voltage interlock loop) and safety features as well as "open case" detection which may cut off power supply upon opening of said housing. Leakage current measurements may be performed in a GFCI (Ground-Fault Circuit Interrupter) implementation, and an HVDC voltage detection may recognize increased voltage drops that may indicate tempering with connections. Backup isolation measurement may be implemented in the universal energy flow manager 126 and/or each ASH. An application may collect feedback from all ASHs and may perform short to chassis or leakage detection via individual HDVC (Positive and negative) measurements. The application may also perform comparison of HVDC measurements from all networked HW. The application may run in a plurality of controllers as a backup and voting logic may be implemented to ensure that a safe state can always be reached.

The housing may also comprise a quick connect 316 that may enable connection of one universal energy flow manager 126 to another via parallel and series configurations. In an embodiment, the housing may have a display such as a touchscreen display or dashboard 112 configured to enable operator input. In an illustrative embodiment, a display of the energy flow manager may receive load shedding configuration form a user and provide power management of energy sources based on the user configuration. Further, the display may output power flow analyses representative of a state of energy sources and/or electrical loads.

Connected to high voltage DC Bus 516 of the universal energy flow manager 126, through the connections interface 312 and contactors 512, may be one or more application specific hardware 114. The application specific hardware may comprise, as shown in FIG. 5, application specific hardware controller (ASH controller 510) which may be receive instructions from the universal energy flow manager. The ASH may also comprise a power conversion module 502 configured to convert, responsive to instructions from the ASH controller, an electrical energy from a first input form into a defined second output form. The power conversion module 502 may be optional. It may also comprise contactors that are operated to connect an input to an output. The defined second output form may be a form that is requested by the universal energy flow manager 126. For, example, the high voltage DC Bus 516 may accept 400V and thus the ASH dedicated to solar input may be instructed to convert a 48V input into a 400V output for the high voltage DC Bus 516.

An ASH may be configured to operate in a first operation mode as a source ASH in which the ASH may connect an energy source to the connections interface and thus, provide energy to the universal energy flow manager. The ASH may also operate in a second operation mode as a load ASH in which the ASH connects a load to the connections interface and thus, receives energy from the universal energy flow manager for delivery to the load.

Figure 7:
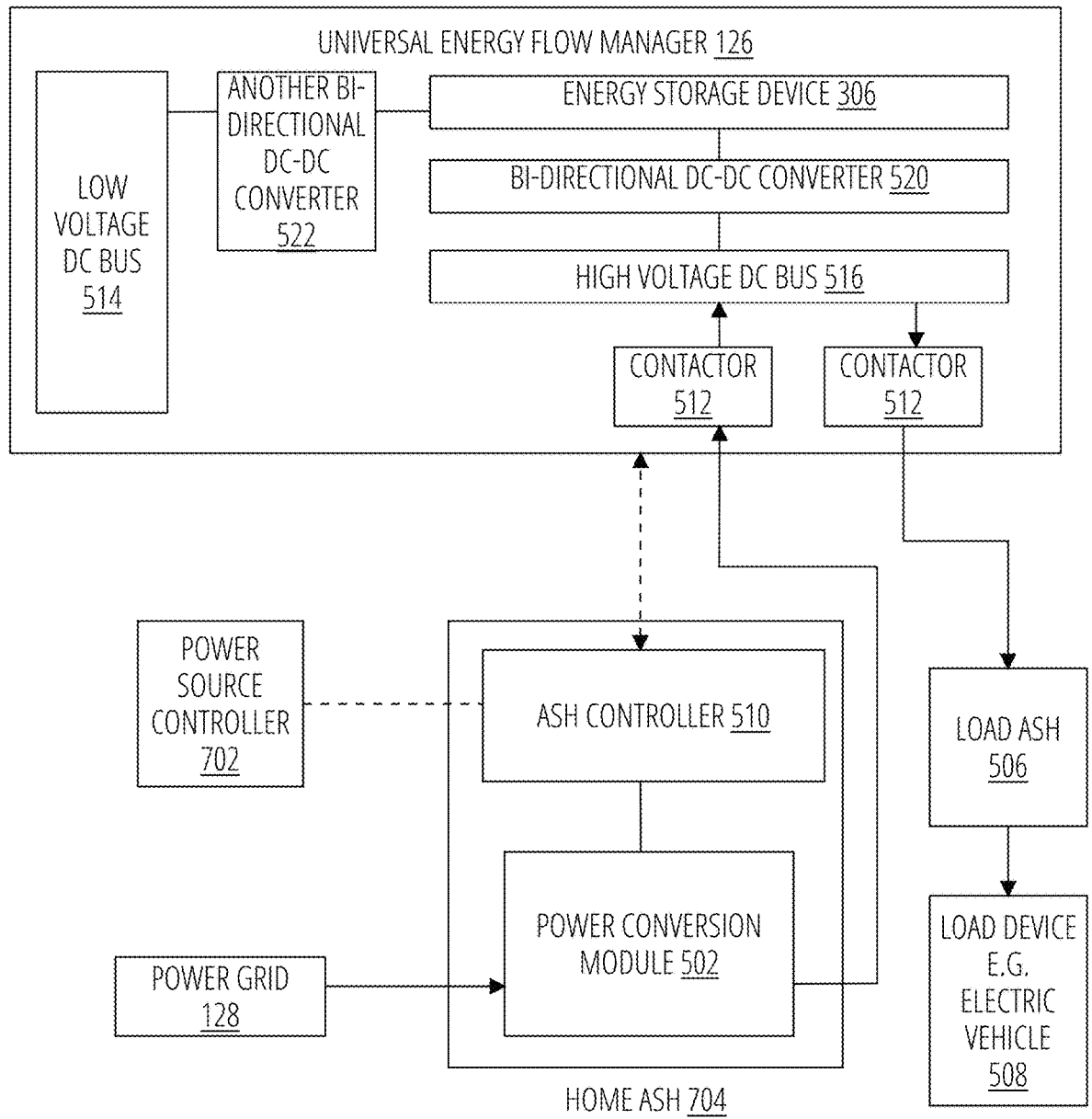
FIG. 7 depicts a block diagram of a home application specific hardware environment in which illustrative embodiments may be implemented.
Figure 8:
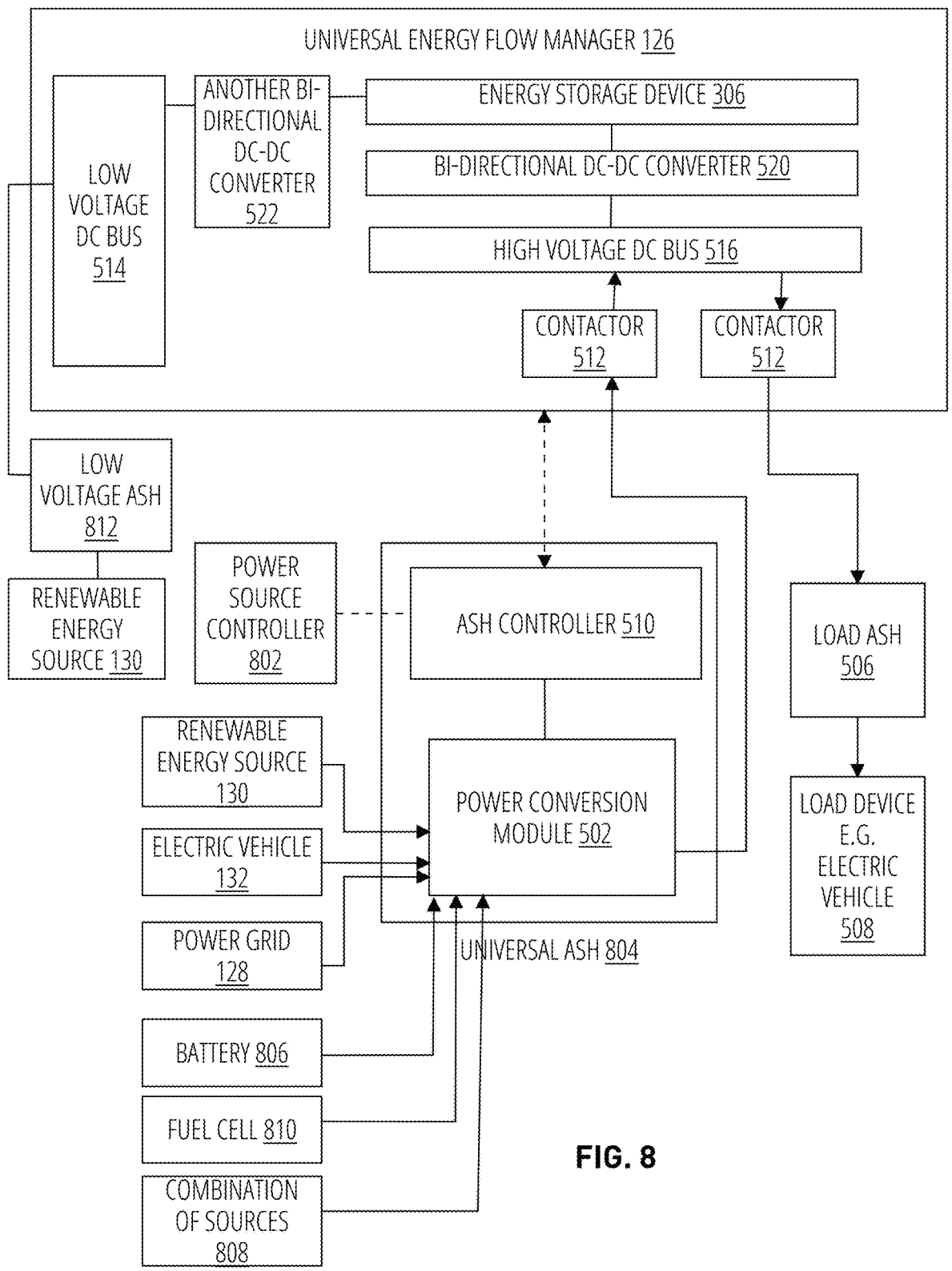
FIG. 8 depicts a block diagram of a universal application specific hardware environment in which illustrative embodiments may be implemented.

An energy management system may comprise a plurality of ASHs. For example, an ASH may be an EV ASH 604 (FIG. 6), an EV ASH with DC Fast charging 902 (FIG. 9) or a home ASH 704 (FIG. 7). An ASH may also be a renewable energy source ASH such as a PV/Wind ASH 906 (photovoltaic/wind ASH). It may also be a fuel cell ASH 910 or hydrogen reformer ASH 912. Further, based on the design of the power conversion module 502 of the ASH (which may include a plurality of different converters) one or more different types of sources may be connected to the same ASH as shown in FIG. 8. The ASH may further comprise Isolation detection and protection components, and interface connector and housekeeping power supplies (HKPS, not shown).

In an embodiment, the ASH may be configured to automatically connect any energy source or any electrical load to the universal energy flow manager.

In the home ASH of FIG. 7, the home ASH 704 may to provide power, in the first operation mode, from a grid energy source (power grid 128) to the universal energy flow manager 126. This energy may be provided to a load device 508 through a load ASH. The energy may be provided as is or converted to another form (such as to a lower voltage) or combined with another source in any suitable configuration of one or more coupled universal energy flow managers 126 and provided to the load ASH 506. The home ASH 704 may alternatively receive power from the universal energy flow manager, in the second operation mode, for provision to a home appliance or tool or for sale to the grid/utility. This home appliance or tool may receive the energy via a smart circuit breaker panel 922 in communication with the universal energy flow manager 126 and in electrical connection with the home ASH 704 working as a load ASH. In some cases, the smart circuit breaker panel 922 may be configured as an ASH having a direct connection to the HVDC Bus.

In an illustrative embodiment, the energy flow manager may be configured to operate one or more ASHs in their first operation modes to aggregate energy to Direct Current (DC) fast charge one or more electric vehicles or one or more electrical loads, wherein DC fast charging may include Level 3 DC fast charging or in some cases charging specifications of 400V-900V. For electric vehicles, the charging speed provided for 400V-900V may be 3 to 20 miles per minute. Due to the ability to aggregate a plurality of energy sources through corresponding ASHs which are external to the universal energy flow manager 126 and which are further managed locally by respective ASH controllers 510 as opposed to direct management via an architecture of the universal energy flow manager 126, any load requirement may be met as long as energy sources can be aggregated. Thus, there may not be any need to redesign the universal energy flow manager 126 for new types of energy sources.

In an embodiment wherein DC fast charging is utilized, a plurality of electric vehicles or electrical loads may be DC fast charged concurrently. In another embodiment, the home ASH 704 may utilize a plurality of universal energy flow manager 126 to charge electric vehicles in parallel or in a time multiplexed method. The home ASH 704 may allow EV charging from not only a grid but also from other sources including, solar, wind, fuel cell, another EV, grid battery or a combination of these through connection of the other sources to the home ASH 704. The home ASH 704 may also have a standard 240V plug 904 and/or 120V plug. A power conversion module 502 of the home ASH 704 may comprise an inverter or rectifier to convert DC to AC or AC to DC respectively depending on the mode of operation. It may also comprise a DC to DC converter to supply DC loads.

Figure 6:
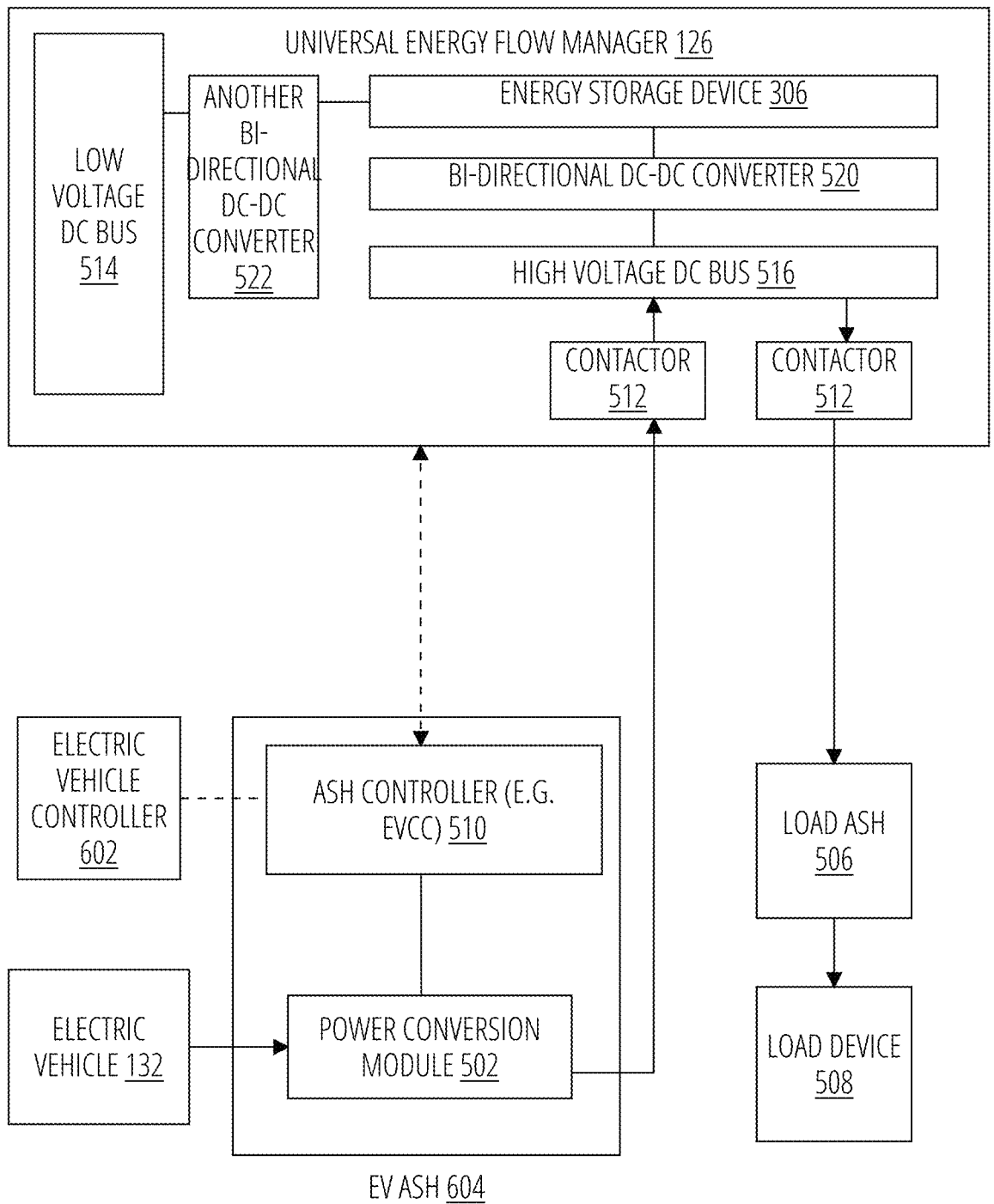
FIG. 6 depicts a block diagram of an electric vehicle application specific hardware environment in which illustrative embodiments may be implemented.

In an electric vehicle ASH (EV ASH 604), as shown in FIG. 6, the EV ASH 604 may be configured to send power, in the first operation mode, from an electric vehicle 132 energy source (for example, an EV battery) to the universal energy flow manager. This energy may be routed to a load device 508 through a corresponding load ASH 506. Thus, the electric vehicle 132 may power a, for example, a home or another EV. In the second operation mode of the EV ASH, the electric vehicle 132 may be a load and may receive power from the universal energy flow manager via the EV ASH 604. Thus, another device (such as the grid, renewable energy source or another EV) may power the subject electric vehicle 132.

The ASH controller 510 of the EV ASH 604 may be an electric vehicle communication controller (EVCC) or may interface with an EVCC. The EVCC may have inbuilt CAN and PLC communication protocols and may serve as a communication gateway between the vehicle and the rest of the energy management system 124. The power conversion module 502 may comprise a DC-DC converter configured to convert a first input voltage to a second output voltage. Contactors of the EV ASH 604 may be used to implement a time multiplexed charging algorithm and for protection during isolation failure detection. In a vehicle to vehicle implementation where the EV ASH 604 provides energy from one vehicle to another, EV ASHs may communicate with the universal flow manager to set the proper HVDC bus voltage, wherein, for example, a 400V EV may supply an 800V EV. This may allow for power transfer from vehicle to vehicle.

Figure 9:
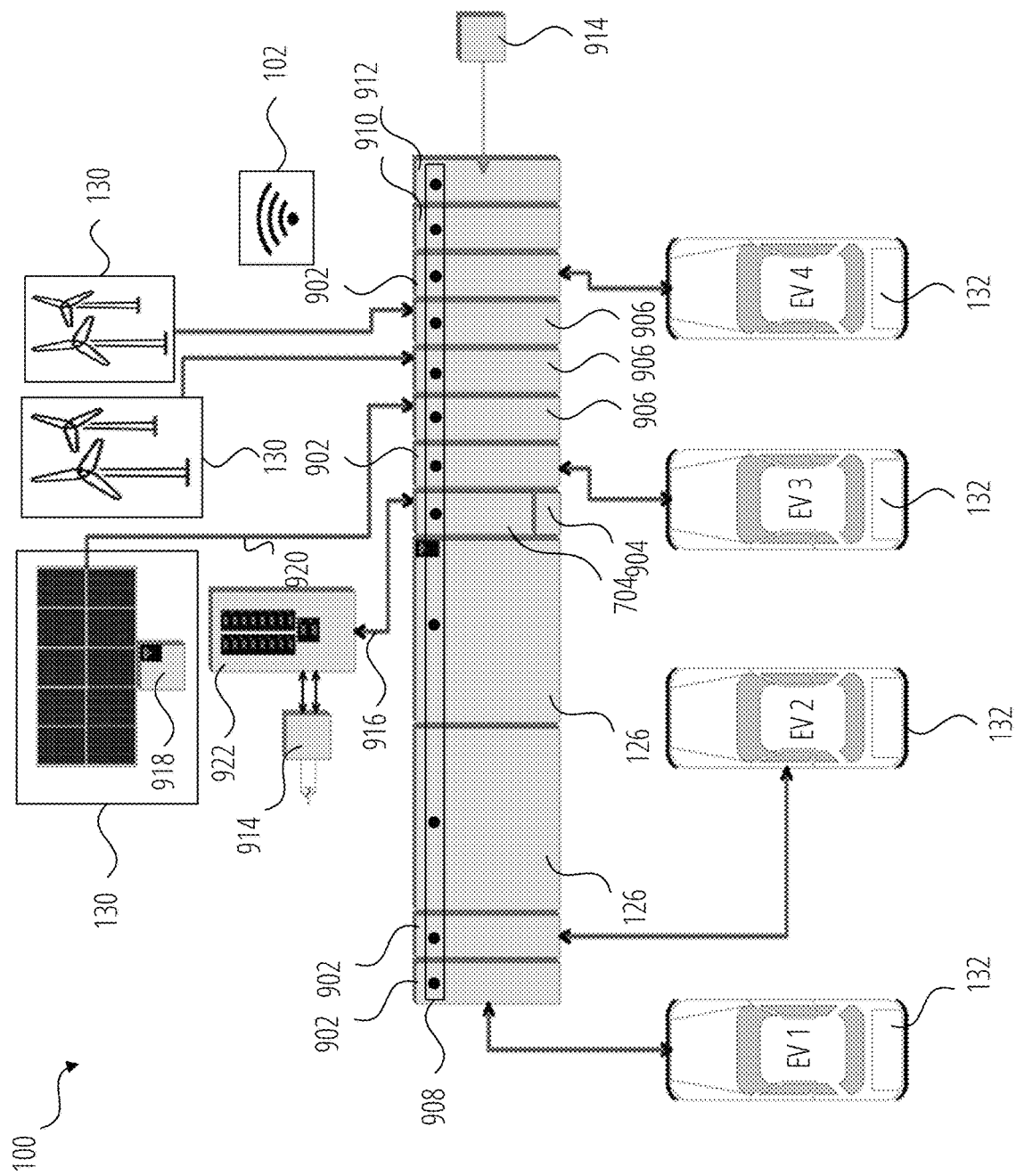
FIG. 9 depicts a sketch of an energy management environment in which illustrative embodiments may be implemented.

The ASH may further be a renewable energy source ASH or fuel cell ASH configured to provide power, in the first operation mode, from a renewable energy source or fuel cell to the universal energy flow manager, where the renewable energy source is a photovoltaic/solar energy source, a wind energy source, or another renewable energy source. As shown in FIG. 9, the ASH may also be a PV/Wind ASH 906 (photovoltaic/wind ASH), a fuel cell ASH 910, or a hydrogen reformer ASH 912.

In an aspect herein, the energy management system may universal energy flow manager 126 may be portable and may act as a standalone energy source by using the on-board energy storage device 306 as a battery to charge one or more loads. For example, the universal energy flow manager 126 may be used as a range extender battery in an electric vehicle power supply system.

Figure 10:
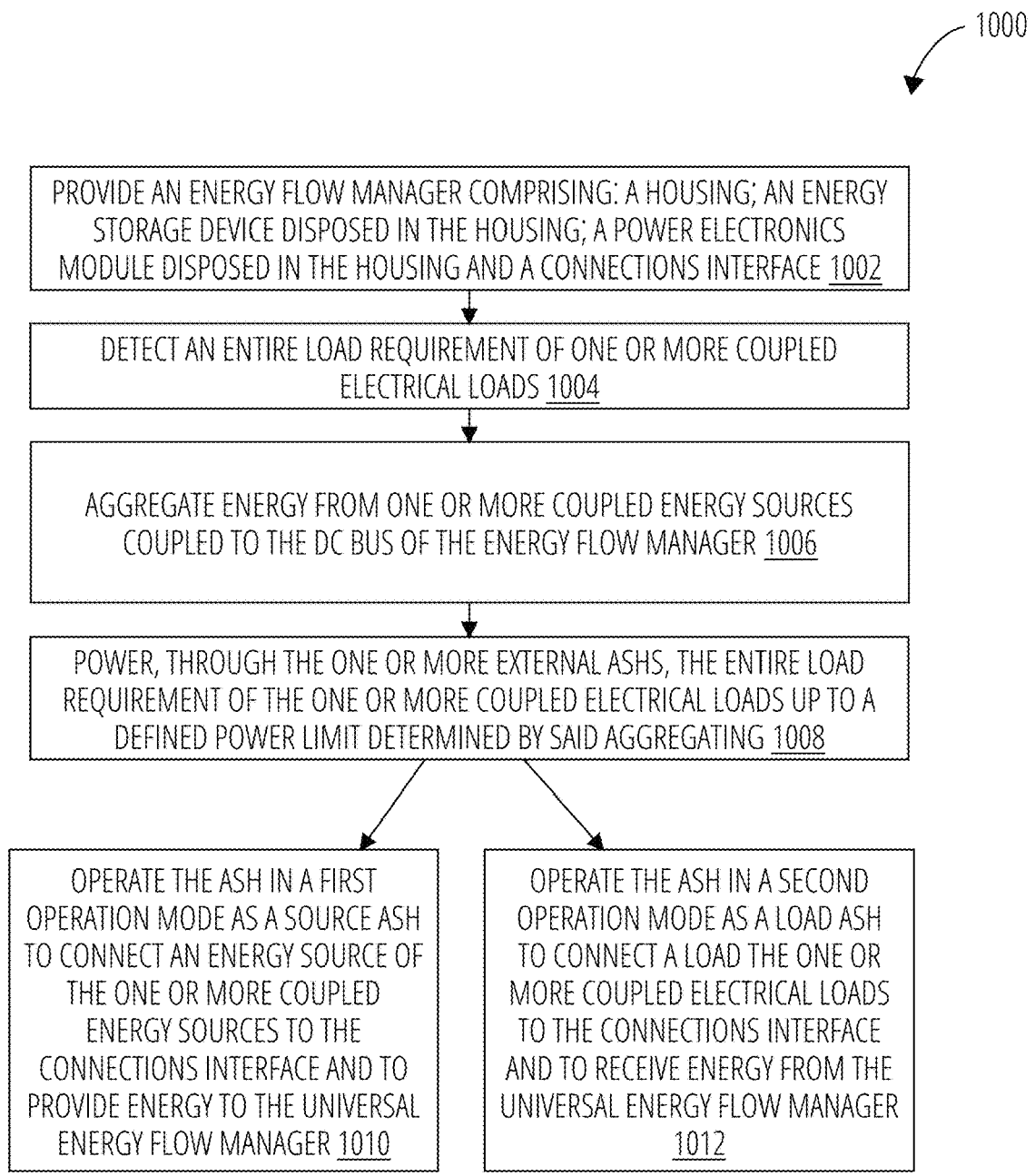
FIG. 10 depicts a flowchart of an energy management process in which illustrative embodiments may be implemented.

Turning now to FIG. 9 and FIG. 10, an energy management environment 100 and a method thereof are shown. The environment 100 may comprise a network/communication infrastructure 102, a plurality of universal energy flow managers 126, a renewable energy source 130, a plurality of electric vehicles 132, a home ASH 704, a plurality of EV ASH with DC Fast charging 902, a 240V plug 904 of the home ASH 704, a PV/Wind ASH 906, a DC Bus 908, a fuel cell ASH 910, a hydrogen reformer ASH 912, a service entrance 914, an AC line 916, a DCDC converter 918, a DC line 920, and a smart circuit breaker panel 922. In the environment, the plurality of electric vehicles 132 may be charged concurrently. The plurality of energy sources may also be harvested via connections to one or more universal energy flow managers 126. An application 136 of the one or more universal energy flow managers 126 may perform an energy management process 1000 of FIG. 10. The energy management process may begin at step 1002 wherein the process provides the one or more universal energy flow managers. In the case of a plurality of universal energy flow managers, a controller of one primary manager (primary controller) may control a controller of the remaining secondary managers (secondary controllers). Herein, the primary controller may determine where to route energy and may route said energy to a DC Bus/HVDC Bus of a connected secondary manager for provision to one or more loads. Thus, the primary controller may detect or measure an entire load requirement of one or more coupled electrical loads in step 1004. This may be done through detecting that one or more ASHs are connected. The controller may combine, in step 1006, energy from one or more coupled energy sources coupled to the energy flow manager through instructions relayed to respective ASH controllers of the one or more coupled energy sources. The controller may then power, in step 1008, through the ASHs, the entire load requirement of the one or more coupled electrical loads up to a defined power limit determined by said aggregating. The powering may further conform to a plurality of defined logic related to performing an EV charging, performing a backup charging, reducing costs, maximizing battery life and allowing off grid usage. As shown in step 1010, this may be achieved by operating a first ASH in a first operation mode as a source ASH to connect an energy source of the one or more coupled energy sources to the connections interface of the universal energy flow manager 126 to provide energy to the universal energy flow manager. The powering of the entire load requirements may also be achieved, as shown in step 1012, through operating a second ASH in a second operation mode as a load ASH to connect the one or more coupled electrical loads to the connections interface to receive energy from the universal energy flow manager. By so doing, the energy flow manager may route power from EV 1 to charge EV 2 as shown in FIG. 9. The energy flow manager may also route power from the renewable energy source 130 to charge EV3. EV 4 may be used as a source to power the home load via the home ASH 704 acting as a load ASH. Further, these may all happen concurrently as the available power may not be limited by just the available grid energy from the service entrance 914.

Figure 11:
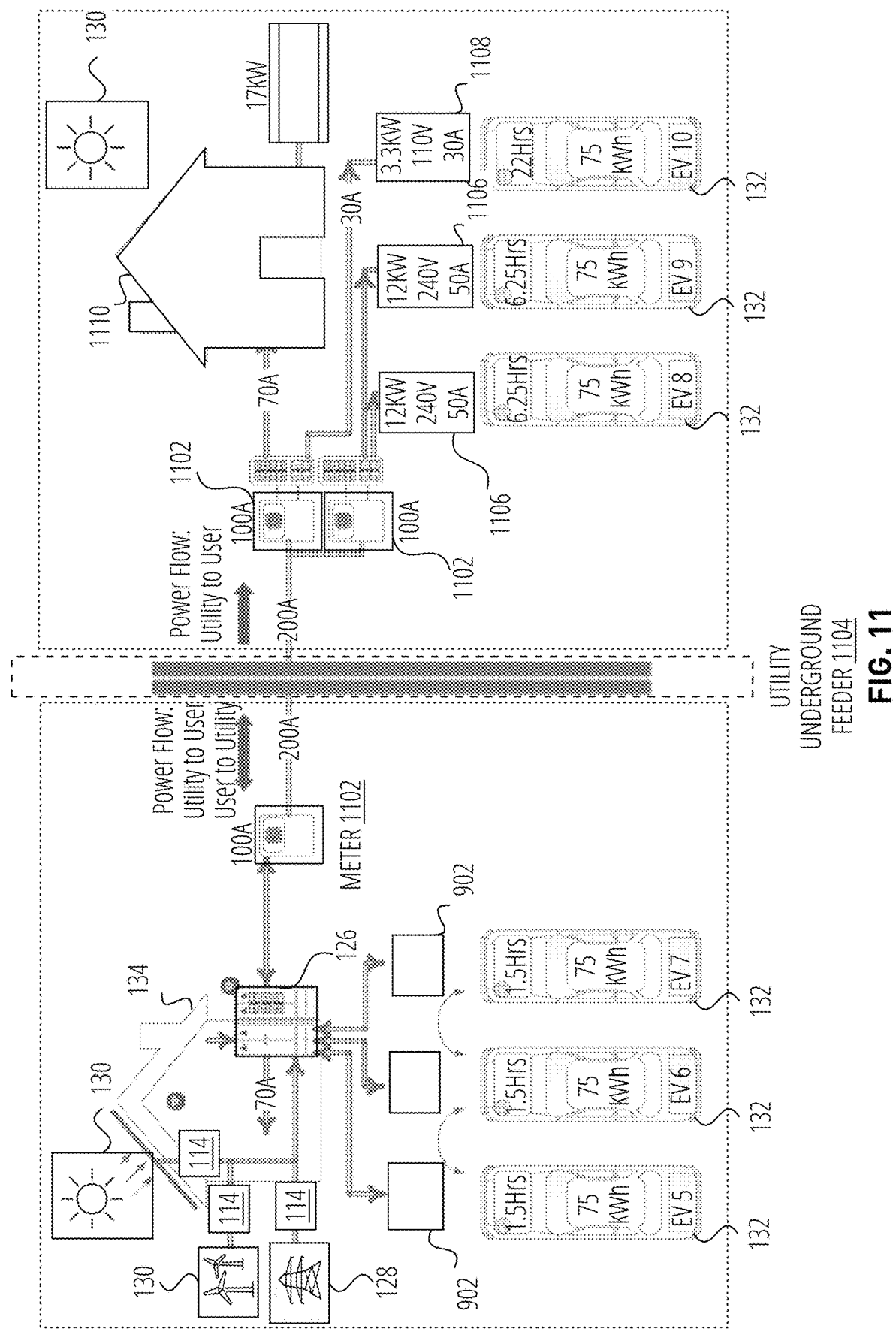
FIG. 11 depicts a sketch of an energy management environment in which illustrative embodiments may be implemented.

FIG. 11 illustrates an energy management in a residential setting having a home 134 with a plurality of EV ASHs with DC Fast charging 902. A utility underground feeder 1104 may provide currents of, for example, 200 A to a meter 1102 of the home 134. Power may flow bi-directionally between the meter 1102 of the home 134, which is connected to the universal energy flow manager 126, and the utility underground feeder 1104. The universal energy flow manager 126 of the home may also be connected to a plurality of other energy sources (130, 128). Three electric vehicles 132, for example, may be connected to the universal energy flow manager 126. Herein, each of the three electric vehicles 132 may have an EV ASH with DC Fast charging 902. To charge the electric vehicles 132 in a selected time period of about 1.5 Hours, 75 kWh of energy might be needed, assuming an EV consume power of 50 kW. When three vehicles EV 5, EV 6 and EV 7 are being charged concurrently, a current of, for example, 125 A each may be needed for the electric vehicles 132. Since the utility underground feeder 1104 may be limited to 200 Amperes, and 70 Amperes may be needed for home loads, the remaining current needed for DC fast charging may be drawn from the other energy sources to DC fast charge the vehicles concurrently. Thus level 3 charging of one or more vehicles may be introduced to a residential setting without compromising the ability to concurrently provide energy to other home electrical loads.

On the other hand, another home 1110 may not have the universal energy flow manager 126 and may thus be limited to the 200 Amperes current from the utility underground feeder 1104. Said another home 1110 may have AC Level 2 chargers (AC L2 chargers 1106) and AC Level 1 chargers (AC L1 chargers 1108). An AC charger may provide power to the on-board charger of a vehicle, converting that AC power to DC for the battery. The acceptance rate of the on-board charger may vary but conventionally, it may four or five hours to over twelve hours to fully charge at Level 2. Thus, in said another home 1110, wherein 70 Amperes may be needed to power home loads, the remaining 130 Amperes may be divided between the electric vehicles 132, wherein charging may be limited to only Level 2 charging at 50 Amperes and Level 1 charging at 30 Amperes. Thus EV 8 and EV 9 may be fully charged in 6.25 Hours, for example, and EV 10 may be fully charged in 22 Hours.

Intelligent Energy Management

The illustrative embodiments further recognize that conventional residential energy management systems may mostly interface with the grid for energy delivery and may, at best, rely on predefined logic for energy management. The illustrative embodiments recognize that conventional systems may be incapable of predicting energy consumption needs and restricted to rationing energy due to underlying architecture that may not allow variable sources of energy to be used. The illustrative embodiments recognize that while energy and power needs may be estimated to prepare for incoming energy, this may be largely error prone and may not account for external influencing factors such as power outages, unexpected variations in load, changing weather/environmental conditions. Moreover, conventional systems may, at best, rely on connecting energy sources having predetermined and matching voltage and power specifications. The illustrative embodiments recognize that this may limit the control an operator may have over a power management system, leading to imprecise management.

As far as power metering of individual sources and loads of an energy storage system, presently, conventional energy management systems may charge and discharge all individual modules together without being able to provide access to detailed statistics about the individual sources and loads. The illustrative embodiments recognize that monitoring the energies of individual modules in a larger system and controlling them individually to ensure the efficiency and safety of the system as a whole may be critical. For example, by being able to safely connect and disconnect individual loads, based on analyses of detailed information about the system as a whole, without being restricted to predetermined load specifications, the energy management system may be made more efficient, modular and scalable and the availability of energy for different predictive operations may be significantly increased.

The illustrative embodiments used to describe the disclosure generally address and solve the above-described issues and other related complications by intelligent proposal of power delivery operations that may enhance utility cost, available back up energy, charging time and battery life. The illustrative embodiments may solve these problems in a preparatory or "forward-thinking" process that anticipates not only the power/energy demands of home loads, electric vehicles, and other load appliances but also anticipate the availability of energy from connected renewable energy sources, fuel cells, EV batteries and/or other energy sources and operates to meet said load demands by exploiting the modular architecture of the universal energy flow manager 126 and connected ASHs.

Concerning intelligent proposals, certain operations are described as occurring at a certain component or location in an embodiment. Such locality of operations is not intended to be limiting on the illustrative embodiments. Any operation described herein as occurring at or performed by a particular component, e.g., a predictive analysis of load and source data and/or a natural language processing (NLP) analysis of contextual calendar or weather data, can be implemented in such a manner that one component-specific function causes an operation to occur or be performed at another component, e.g., at a local or remote machine learning (ML) or NLP engine respectively.

An embodiment performs automatic power flow routing from multiple sources like multiple batteries, grid, solar, wind fuel cell, other EVs to multiple loads. Another embodiment enables detailed power metering of all sources and loads. A further embodiment performs intelligent load shedding to increase home backup time. Yet another embodiment allows for direct billing to utility to eliminate the need for additional meters if a meter s required to be installed by a utility company.

In an aspect, one embodiment monitors and manages cumulative energy of the energy management system. The embodiment may make decisions on which source to extract energy from based on attributes such as minimizing EV charging times, maximizing available backup during outages, and the like. Another embodiment may monitor a variety of profile sources configured for operators and environments of the energy management system, for example, a renewable energy storage plant that may need to use or store energy during high renewable energy production times, or an electric vehicle may require DC fast charging. A profile source may be an electronic data source from which information usable to determine a profile characteristic of the consumer can be obtained. For example, a profile source may be an operator profile 1222 providing operator information such as preference configuration, including for example, an order of importance of loads to charge, a calendar application comprising the operator's historical and activities and associated energy demands, energy generation events, feedback from the operator or group of operators, or otherwise other operator data. A profile source may also be environment profile 1228 providing data such as past weather conditions, predicted future weather conditions, historical power outage data or otherwise other environmental data. A profile source may be a device, apparatus, software or a platform that may provide information from which an energy/power delivery or retrieval characteristic may be derived. For example, a dashboard 112 may operate as a profile source within the scope of the illustrative embodiments. Moreover, a community such as a group of operators in a residential facility or a group of operators in a group or residential facilities may be a profile source wherein a plurality of storage and delivery characteristics may be obtained to derive a preference, liking, sentiment, or usage of energy. Further, measured power, voltage and health metrics or parameters about sources and loads of the universal energy flow manager 126 and energy management system 124 as a whole, referred to herein generally as energy management system parameters 1220 may be input data and may be utilized to learn from and derive patterns for providing and retrieving energy in the energy management system 124. An operator's/environment's profile data, information and preference, are terms that are used herein interchangeably to indicate a constraint of one or more users/environments that may affect power/energy routing.

Furthermore information/data about the components of the energy management system 124 (such as voltage, power, current, number of connected sources and loads, temperature, state of health (SOH) of batteries, state of charge (SOC) of batteries, average energy consumption, vehicle energy demand profile, home energy demand profile, and the like or otherwise other energy management system parameters 1220 may form part of or be separate from the constraints and may be obtained for use as input to an intelligent power delivery module 1216 for predictive analytics as described hereinafter. Thus, the profile source 1224 information and energy management system parameters 1220 may collectively form at least a part of the input data 1202 or constraints for the intelligent power delivery module 1216 to predict optimal power delivery operations and schedules and perform said operations and observe said schedules.

Operating with profile information from one or more profile sources, an embodiment routinely evaluates the constraints that are applicable to the system and operators. The embodiment adds new constraints/input data when found in profile information analysis, modifies existing constraints when justified by the profile information analysis, and diminishes the use of past constraints depending on the feedback, the observed usage of the constraint and/or presence of support for the past constraint in the profile information. A past constraint may be diminished or aged by deprioritizing the constraint by some degree, including removal/deletion/or rendering ineffective the past constraint. More generally, profile information may be obtained from any source available to the energy management system 124.

The input data 1202 as determined by an embodiment may be variable over time. For example, loads may have time varying parameters that may be measured and used as input. This may provide real time proposals for efficiently operating the energy management system 124. Similarly, the grid energy source may indicate an outage. However, energy may still be needed. Thus, the power delivery module 1216 may propose an option to route energy from a solar panel through a solar panel ASH to power a load in a home.

Further, based on predictive analytics about inclement weather or certain seasons of the year during which renewable energy sources may not be readily available, the power delivery module 1216 may propose decreasing the use of certain home loads to meet a predicted DC fast charging demand and vice versa. Herein, the ability to connect other energy sources, in addition to the ability to automatically detect the power/energy metrics of a connected energy source or load may curb power sharing limitations typically observed with systems that require energy sources with particular specifications.

The intelligent power delivery proposals and techniques described herein generally are unavailable in the conventional methods in the technological field of endeavor pertaining to residential energy management systems. A method of an embodiment described herein, when implemented to execute on a device or data processing system, comprises substantial advancement of the functionality of that device or data processing system in proposals by obtaining constraints and using an advanced modular universal energy flow manager architecture.

In further embodiments, a machine learning engine may be provided to increase the resolution and efficacy of predictions made by the universal energy flow manager based on a comparison of sensed and received information. The machine learning engine may detect patterns and weigh the probable outcomes and energy demand profiles based on these patterns. As an operator engages with the universal energy flow manager 126, data regarding the consumption may be collected and stored for analysis by the controller of the universal energy flow manager 126 or another network-connected computerized device. The data may be aggregated to allow additional resolution in detecting patterns and predicting behavior. The machine learning engine may perform an analysis on time series data gathered at the source or load or environment, and supplemental information such as that provided over a network, and/or other information to draw correlations. For example, the machine learning engine may perform a linear algebra regression analysis on the time series step data to find the best-fit parameter values. The machine learning engine may additionally return operational parameters, for example, that may be used by a controller in energy management.

Client application 120 of FIG. 1, dashboard application of FIG. 1, server application 116 of FIG. 1 or any other application such application 1204 may implements an embodiment described herein. Any of the applications can use data from the energy management system 124, and profile sources to propose power delivery proposals and implement said proposals. The applications can also obtain data from storage unit 108 for predictive analytics. The applications can also execute in any data processing systems (server 104 or server 106, client 110, dashboard 112).

In one aspect, a computer-implemented method is disclosed that comprises receiving an energy demand state of one or more coupled electrical loads coupled to a universal energy flow manager via a load application specific hardware (load ASH), the energy demand state being indicative of a desired amount of energy needed by the one or more coupled electrical loads in an energy management environment. The method may further comprise receiving an available energy state of one or more coupled energy sources coupled to the universal energy flow manager via a source application specific hardware (source ASH), the available energy state being indicative of an available amount of energy from the one or more coupled energy sources in the energy management environment, generating input data using at least the energy demand and available energy states, extracting one or more features from the input data, the one or more features representative of a characteristic of a request for a power delivery proposal operation, proposing, using the power delivery module, at least one power delivery proposal for the one or more coupled electrical loads, and performing a power delivery operation based on the power delivery proposal.

Figure 12:
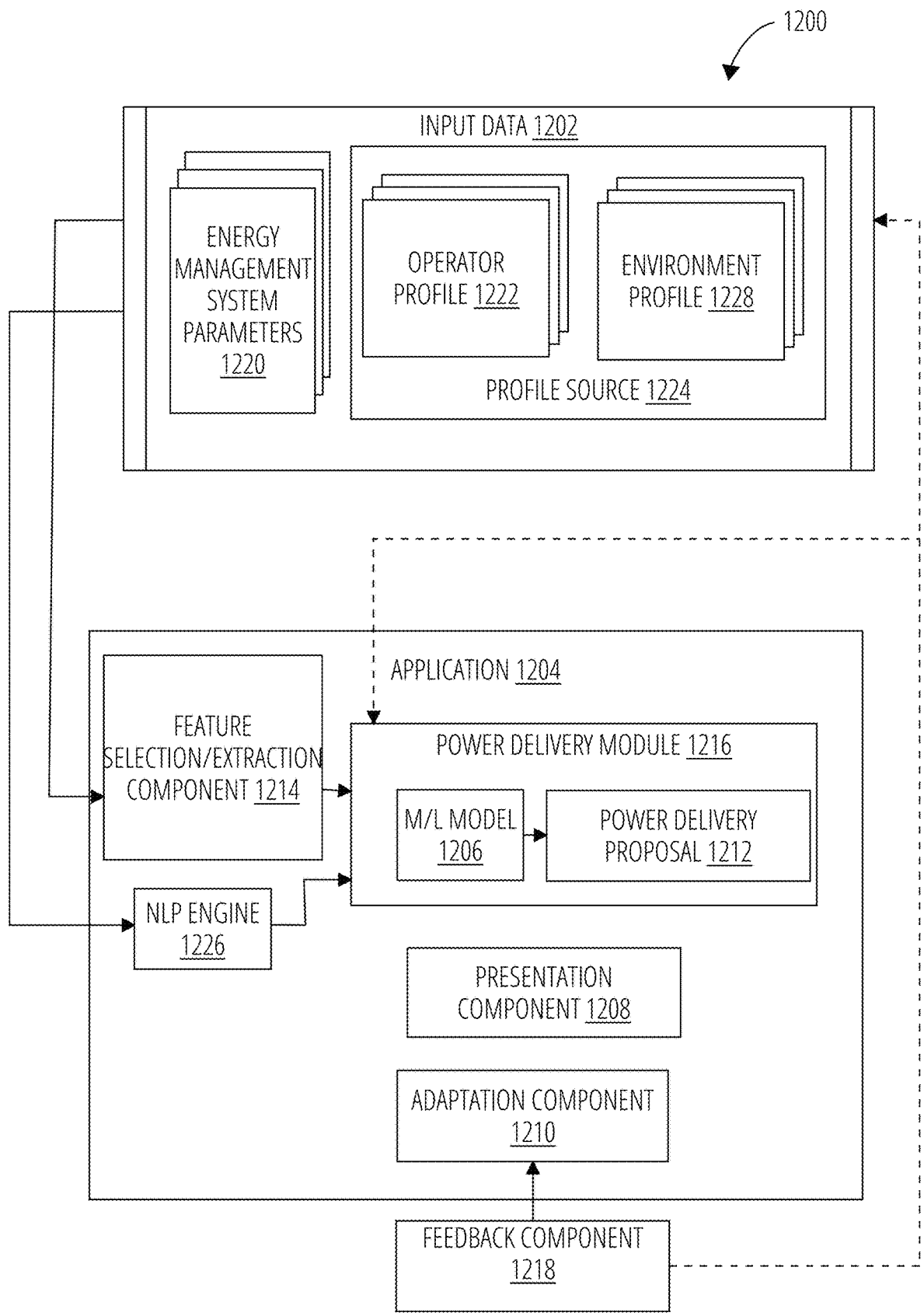
FIG. 12 depicts a block diagram of a machine learning configuration in which illustrative embodiments may be implemented.

Concerning FIG. 12, this figure depicts a diagram of an example configuration for intelligent power delivery in accordance with an illustrative embodiment. The intelligent power delivery can be implemented using application 1204 in FIG. 12. Application 1204 may be an example of application 136, server application 116, client application 120 or dashboard application 122, for example. The application 1204 may receive or monitors, for example in real time, a set of input data 1202. The input data comprises energy management system parameters 1220. The input data may also comprise operator and environmental characteristics from profile sources 1224 (operator profile 1222, environment profile 1228) such as preferences, pre-planned energy storage, average daily driving distance, past driving energy consumption per mile, calendar data for a timelining procedure, and weather data.

In one or more embodiments described herein, characteristics, properties, and/or preferences associated with an operator, an environment, a load, a source etc. are referred to as "features". In one or more embodiments, the configuration 1200 defines and configures an algorithm and/or rule to drive feature selection results. In particular embodiments an algorithm may include, for example, determining a lowest common value for a feature, and determining whether the value satisfies a best match within a threshold value (e.g., 90%) of the feature. In an embodiment, the system may prioritize certain features so that features such as battery life, charging time, utility cost and available backup energy carry different weights. In an embodiment, after a common denominator in a plurality of operators is found, the configuration 1200 understands the problems with individual operators, and extracts and derives the best feature values that will help in intelligent proposals.

In an embodiment, features may be selected or extracted from outside the machine learning model. However, in another embodiment, features may additionally be extracted inside the machine learning model/deep neural network and thus may be integral to the model. Feature extraction and selection are therefore generally used interchangeably herein.

In an embodiment, feature selection/extraction component 1214 is configured to generate relevant features, based on contents of a request from application 1204, using data from all the different available features (e.g., energy management system parameters 1220, operator profile 1222, environment profile 1228). In the embodiment, feature selection/extraction component 1214 may receive a request from application 1204 which may include at least an identification or detection of a load as well as instructions to propose and implement corresponding power delivery proposals. Using the energy management system parameters 1220 and/or profile source 1224, feature selection/extraction component 1214 may obtain a combination of specific energy management system parameters 1220, profile information from operator profile 1222, and environmental data from environment profile 1228. In the embodiment, feature selection/extraction component 1214 may use a defined algorithm of prioritization to generate the features as feature profile. In a particular embodiment, the feature profile includes each feature (e.g., 1. a load voltage, 2. a load power, 3. a weather forecast, 4. connected secondary energy flow managers 5. a source power, 6. A source power 7. an EV charging time, 8. an operator preference, 9. remaining life cycles of an EV battery and 10. weights given to each feature). Using the extracted features and a trained M/L model 1206 that has been trained using a large number of different datasets, power delivery module 1216 may determine a power delivery proposal 1212 for the system.

The power delivery proposal 1212 may comprise instructions to automatically route a defined amount of power from a particular source to a particular load. The automatic power flow routing may be from multiple sources including, for example, multiple batteries, the grid, solar panels, wind energy source, fuel cells, and other EVs to multiple loads such as a home load or an EV with depleted battery energy near a time of regular usage.

The power delivery proposal 1212 may comprise detailed reports about energy consumption that may enable a utility company to understand how much energy is used for EVs or other specific loads, which may eliminate or reduce the need for separate meters and thus, reduce utility costs.

The power delivery proposal 1212 may also comprise instructions to automatically route power to specific loads based on user preferences. For example, a user preference may include minimizing energy transfer from or to a battery pack. In an embodiment, the power delivery proposal 1212 may comprise instructions to maximize an EV charging speed. Herein a connected EV ASH 604 may be operated to close its contactors. Unnecessary loads such as AC and pool equipment may be shut down, grid power usage may be maximized, power from renewable sources may be maximized and routed to the high voltage DC Bus 516 and power from the high voltage DC Bus 516 may be delivered to the EV through the EV ASH 604.

The power delivery proposal 1212 may further comprise instructions to operate the energy management system 124 in an intelligent backup mode of operation wherein for a defined period of time after a grid power outage (for example 3 hours), home loads may be operated. After said defined period of time, non-essential loads may be shut down based on operator preferences or learned shutdown parameters and remaining energy sources may be used to automatically and progressively manage the system. Thus, the power delivery proposal may include load shedding instructions to increase home backup time. Further, the system or the energy flow manager may have a power inverter that provides seamless power transfer. The power inverter may be configured to be running at all times and may switch power within one cycle. The power delivery proposal 1212 may comprise intelligent energy forecasting that may estimate a required amount of energy to be stored overnight and compensate for changing weather conditions that may hinder photovoltaic and wind energy availability. Further an automatic grid outage interface to the utility may allow the energy management system to anticipate required dropout time.

The power delivery proposal 1212 may further comprise instructions to maximize pay back and usage of renewable energy sources during a defined time period, such as, during the day. For example, excess power may be sold back to utility or stored in the energy storage device 306 of the universal energy flow manager 126. At night or during off peak hours, renewable energy may be used to power home loads and charge batteries. Power may also be obtained from an EV while retaining a minimum charge desired by an EV operator. One or more of these strategies may be chosen to minimize or eliminate peak charge rates. Further instructions may comprise optimizing system management to achieve net zero or near net zero utility energy transfer.

Even further, the power delivery proposal 1212 may comprise instructions to maximize battery life wherein for operators interested in a lowest maintenance cost, battery usage may be minimized to achieve relatively longer battery life.

The power delivery proposal 1212 may further comprise instructions to rebalance energy storage between batteries or energy storage devices 306 of connected universal energy flow managers 126 by active charge/discharge throttling.

The proposals may be provided in real time as the input changes and implementation of the proposals may be performed in real time or upon receiving operator confirmation. User feedback concerning an accuracy of the proposals may also be used in modifying the machine learning model. By providing one or more of these cell operation and manufacturing operation proposals, and executing said proposals, a highly energy efficient, self-supporting and cost-efficient energy management system and environment may be obtained. These examples are not meant to be limiting and any combination of these and other example power output proposals are possible in light of the descriptions.

The power delivery module 1216 can be based, for example, on a neural network such as a recurrent neural network (RNN), although it is not meant to be limiting. An RNN is a type of artificial neural network designed to recognize patterns in sequences of data, such as numerical times series prediction and numerical time series anomaly detection using data emanating from sensors, generating image descriptions and content summarization. RNNs may use recurrent connections (going in the opposite direction that the "normal" signal flow) which form cycles in the network's topology. Computations derived from earlier input are fed back into the network, which gives an RNN a "short-term memory". Feedback networks, such as RNNs, are dynamic; their 'state' is changing continuously until they reach an equilibrium point. For this reason, RNNs are particularly suited for detecting relationships across time in a given set of data. Recurrent networks take as their input not just the current input example they see, but also what they have perceived previously in time. The decision a recurrent net reached at time step t-1 may affect the decision it will reach one moment later at time step t. Thus, recurrent networks have two sources of input, the present and the recent past, which combine to determine how they respond to new data.

In an illustrative embodiment, the power delivery proposals 1212 may be presented, by a presentation component 1208 of application 1204. An adaptation component 1210 may be configured to receive input from a user to adapt the power delivery proposals 1212 if necessary. For example, changing a tolerated minimum charging time proposed by the power delivery module 1216 causes a recalculation of a power delivery proposal 1212 that takes the new tolerated minimum charging time into consideration.

Feedback component 1218 optionally collects user or consumer feedback relative to the power delivery proposals 1212. In one embodiment, application 1204 may be configured not only to compute power delivery proposals 1212 but also to provide a method for a user to input feedback, where the feedback is indicative of an accuracy of the computed power delivery proposals 1212. Feedback component 1218 applies the feedback in a machine learning technique such as to profiles or to M/L model 1206 to modify the M/L model 1206 for better proposals. In an illustrative embodiment, the application analyzes said feedback input and the application reinforces the M/L model 1206 of the power delivery module 1216. If the feedback is satisfactory or unsatisfactory as to the accuracy of the proposal, the application strengthens or weakens parameters of the M/L model 1206 respectively.

The input layer of the neural network model can be, for example, a vector representative of a current, voltage or power, contextual weather or calendar data provided by an NLP engine 1226, etc. In an example, a CNN (convolutional neural network) uses convolution to extract features from an input. In an embodiment, upon receiving a request to provide a proposal, the application creates an array of values that are input to the input neurons of the M/L model 1206 to produce an array that contains the power delivery proposals 1212.

Figure 13:
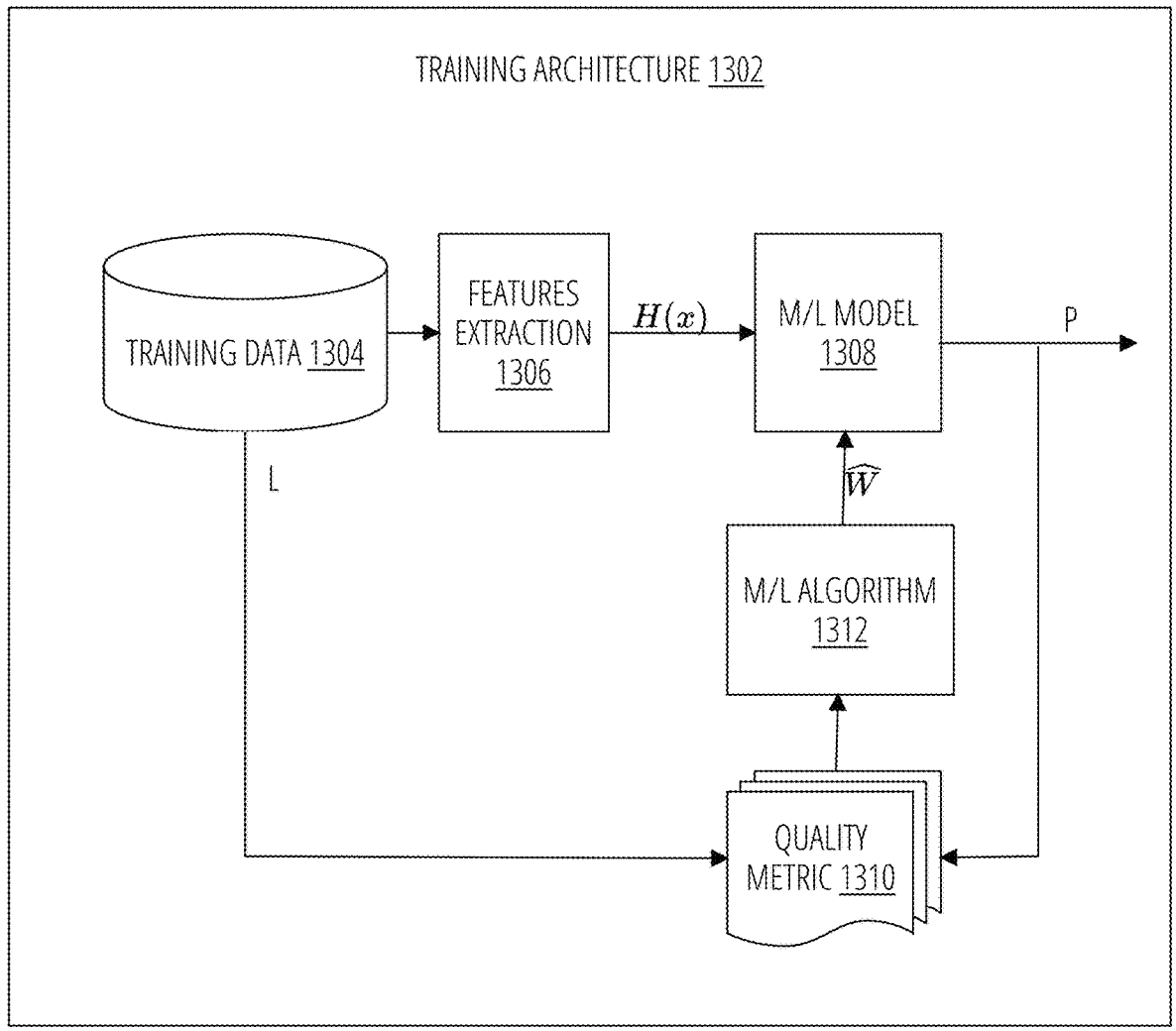
FIG. 13 depicts a block diagram of a training architecture in which illustrative embodiments may be implemented.

The neural network M/L model 1206 may be trained using various types of training data sets including stored profiles and a large number of sample cell measurements. As shown in FIG. 13, which depicts a block diagram of an example training architecture 1302 for machine-learning based recommendation generation in accordance with an illustrative embodiment, program code extracts various features 1306 from training data 1304. The components of the training data 1304 have labels L. The features are utilized to develop a predictor function, H(x) or a hypothesis, which the program code utilizes as a M/L model 1308. In identifying various features in the training data 1304, the program code may utilize various techniques including, but not limited to, mutual information, which is an example of a method that can be utilized to identify features in an embodiment. Other embodiments may utilize varying techniques to select features, including but not limited to, principal component analysis, diffusion mapping, a Random Forest, and/or recursive feature elimination (a brute force approach to selecting features), to select the features. "P" is the output that can be obtained, which when received, could further trigger the energy management system 124 to perform other steps such steps of a stored instruction. The program code may utilize a machine learning m/l algorithm 1312 to train M/L model 1308, including providing weights for the outputs, so that the program code can prioritize various changes based on the predictor functions that comprise the M/L model 1308. The output can be evaluated by a quality metric 1310.

By selecting a diverse set of training data 1304, the program code trains M/L model 1308 to identify and weight various features. To utilize the M/L model 1308, the program code obtains (or derives) input data or features to generate an array of values to input into input neurons of a neural network. Responsive to these inputs, the output neurons of the neural network produce an array that includes the power delivery proposal to be presented or implemented contemporaneously.

Figure 14:
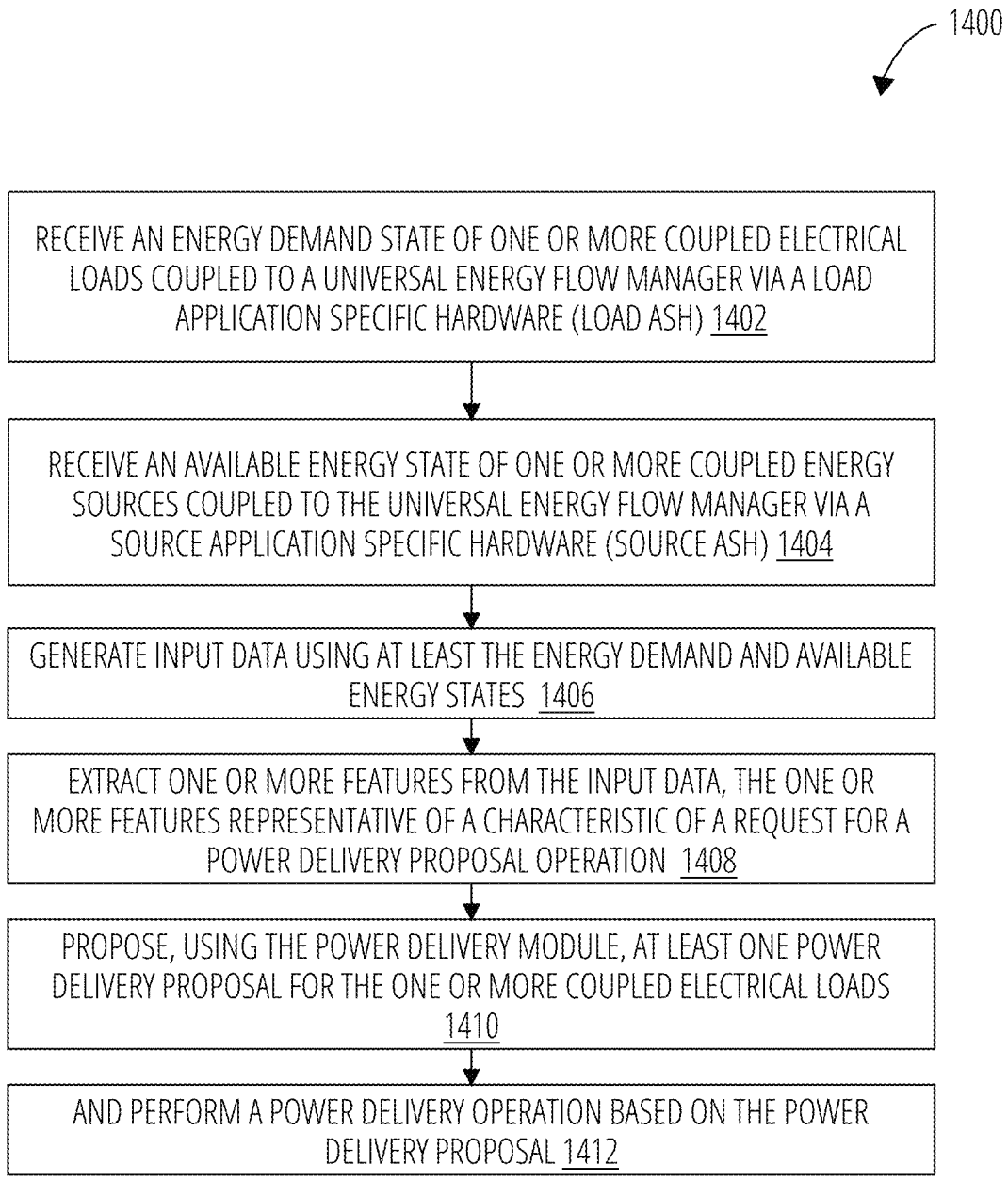
FIG. 14 depicts a flowchart of a power delivery process in which illustrative embodiments may be implemented.

Turning now to FIG. 14, a M/L process 1400 is disclosed. The process may begin at step 1402, wherein process 1400 may receive an energy demand state of one or more coupled electrical loads coupled to a universal energy flow manager via a load application specific hardware (load ASH), the energy demand state being indicative of a desired amount of energy needed by the one or more coupled electrical loads in an energy management environment. In step 1404, process 1400 may receive an available energy state of one or more coupled energy sources coupled to the universal energy flow manager via a source application specific hardware (source ASH), the available energy state being indicative of an available amount of energy from the one or more coupled energy sources in the energy management environment. In step 1406, process 1400 generates input data using at least the energy demand and available energy states. The available energy demand state and available energy states may include a voltage level, a current level, a power level and/or a charging time. In step 1408, process 1400 may extract one or more features from the input data, the one or more features being representative of a characteristic of a request for a power delivery proposal operation. In step 1410, process 1400 may propose, using the power delivery module, at least one power delivery proposal for the one or more coupled electrical loads. In step 1412, process 1400 and performs a power delivery operation based on the power delivery proposal. The power delivery module may operate a machine learning engine. The power delivery operation may be performed through operating a source ASH to obtain power for routing to a load ASH of the one or more coupled electrical loads. The power delivery operation may also be performed automatically and a plurality of loads, for example, a plurality of EVs may be powered by time division multiplexing of load—source pairs.

Figure 15:
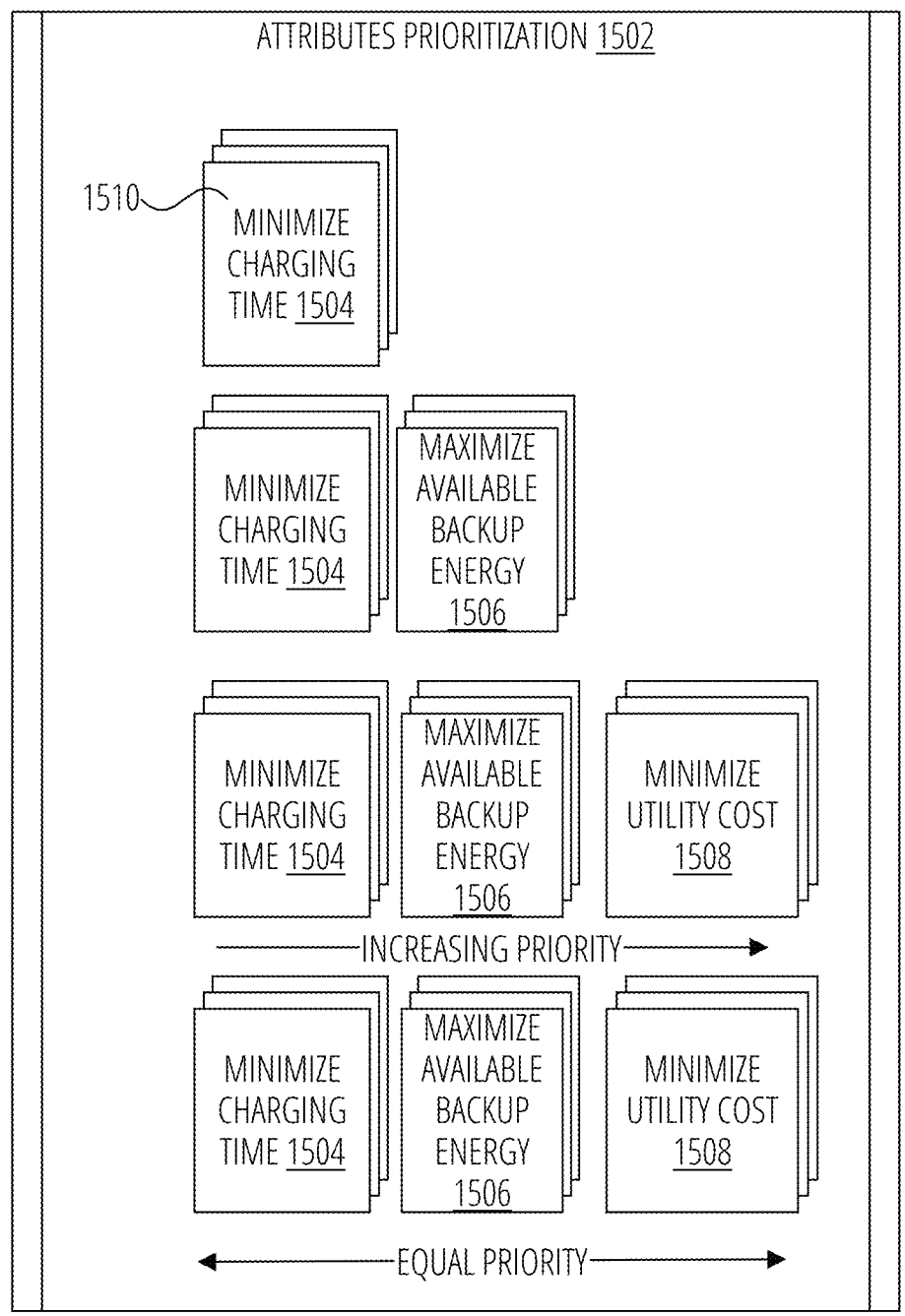
FIG. 15 depicts a block diagram of an example prioritization of attributes in which illustrative embodiments may be implemented.

Concerning step 1408, the one or more features may also represent attributes obtained from an attribute prioritization 1502 step, as shown in FIG. 15. In the attribute prioritization, one or more attributes 1510 to consider for an output proposal operation may be obtained. The one or more attributes may have different assigned priorities or weights or may have the same or even unassigned priority or weight. By training the M/L model 1308 with a large set of different datasets that consider the attributes 1510, different scenarios can be handled by the power delivery module 1216. In an illustrative and non-limiting embodiment, the attributes 1510 include instructions to minimize charging time 1504, maximize available backup energy 1506 from energy sources, and minimize utility cost 1508. Other attributes may include, for example, maximizing pay back or excess energy sales, maximize system safety, and maximizing battery life.

Thus, in an illustrative embodiment, the power delivery module 1216 operates based on a system of merits and demerits that functions to maximize life, safety, utility costs, and other attributes while also considering other input parameters.

Charge Hailing Service

The illustrative embodiments recognize that as the use of electric vehicles rises, owners may be regularly presented with a task of finding available chargers for electric vehicles, especially when traveling away from home. In some new environments, owners may not be readily able to find chargers that meet their requirements. The illustrative embodiments recognize that even if public chargers may be available, they may be limited in number, capacity and may come with protracted waiting times, especially for in-demand chargers that may meet a fast charging requirement. Further, providing enough fast chargers to meet rising demands may be an arduous task that may be insurmountable without a novel approach.

The illustrative embodiments may disclose a residential battery-based charging network for passenger and fleet services to ease charging accessibility and reduce downtime costs. The charging may comprise, DC fast charging and may expand a public DC Fast charging network to include privately owned and operated DCFC network which may in turn reduce downtime cost to delivery fleet and ride-hailing services, for example. By employing, in a charge-hailing network, a plurality of universal energy flow managers 126 and corresponding distributed sources of energy, a modular and scalable charging architecture may be provided to significantly increase availability of chargers and decrease waiting and charging times. Further remote locations may gain increased availability of chargers, grid outages may not significantly hinder EV charging, less load may be exerted on utility systems and DC fast charging may become more accessible. Even further, site or feeder upgrades may not be necessary due to an ability of the universal energy flow manager to connect with independent energy sources without a requirement for matching specifications.

Figure 16:
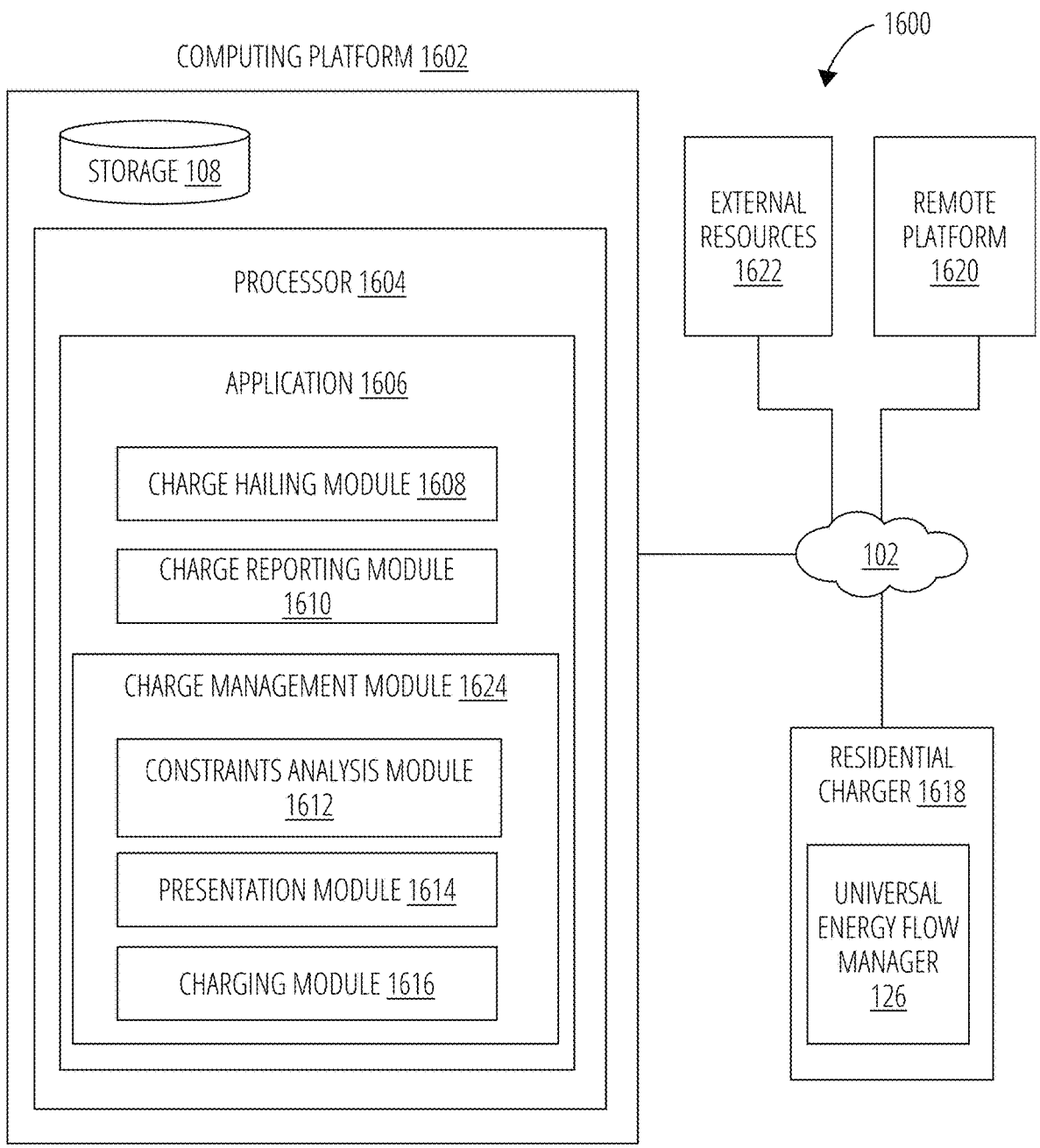
FIG. 16 depicts a system configured for charge hailing, in accordance with one or more implementations

Turning to FIG. 16, computing platform 1602 may be configured by application 1606 or a set of applications. Application 1606 may be an example of a server application 116 of FIG. 1 or other application and may include one or more instruction modules or communicate with one or more remote, external or client instruction modules, of for example, the client 110, dashboard 112, a personal mobile device, and the residential charger 1618. The instruction modules may include computer program modules. The instruction modules may include one or more of a charge hailing module 1608, a charge reporting module 1610, a constraints analysis module 1612, a presentation module 1614, a charging module 1616 and/or other instruction modules. In an aspect, an EV operator/owner/customer/client may have a device that needs charging. Residential chargers 1618 comprising one or more universal energy flow managers 126 may periodically update a central application through the charge reporting module 1610 with residential charger status parameters including, for example, remaining energy, availability, location, DC fast chargers, connected energy sources, state of charge, costs, state of health or otherwise other residential charger status parameters. The operator may request a charging need, by the charge hailing module 1608, and a location and charge required (e.g., 10 minutes of charging, 20 miles equivalent of charging, etc.) may be shared with the application 1606 through the charge hailing module 1608.

Based on the updates from the residential chargers 1618 and the operator request, the application 1606 may obtain, by the constraints analysis module 1612, a set of available residential chargers 1618. Constraints analysis may comprise identifying the most important limiting factor (i.e., constraint) that may inhibit achieving a goal and then systematically improving that constraint until it is no longer the limiting factor, i.e., a constraint may be a restriction on the degree of freedom in providing a solution. For example, an operator may request DC fast charging which can be completed within the next two hours. The constraints analysis module 1612 may determine a distance and DC Fast charging capability as constraints. The constraints analysis module 1612 may determine a distance of the operator from one or more available residential chargers 1618 and a power level of an HVDC Bus of a universal energy flow manager 126 of the one or more available residential chargers 1618. In another example, a residential charger owner may have a preference that available back charge may not fall below a defined threshold level after completion of any charge hailing service. Based on an amount of charge needed by a client/charge hailer and a number of energy sources connected to the residential charger 1618, constraints analysis may determine that the threshold level may be exceeded upon completion of a future charge hailing operation and may thus remove said residential charger from consideration. In some other examples, the constraints analysis may weigh the importance of identified constraints and address them in order of importance. In some cases, the determined set of available residential chargers may be presented along with an indication of how well each meets the identified constraints. This and other examples may be performed through defined instructions or by machine learning using example constraints as input to a trained deep neural network. Of course, these are only examples as other constraints such as charging costs and other analysis techniques may be determined or requested.

A set of residential chargers 1618 that meet the constraints may be presented, by the presentation module 1614, to the operator. A residential charger may be selected from the set and the operator may transport the electric vehicle to the residential charger for charging, based on instructions from the charging module 1616. Alternatively, an owner of the residential charger may transport a standalone residential charger 1618, having at least an on-board energy storage device 306 to the EV operator for charging. Other factors such as EV owner rating and residential charger owner rating may be considered as discussed herein.

In some implementations, computing platform(s) 1602, remote platform(s) 1620, residential chargers 1618 and/or external resources 1622 may be operatively linked via one or more electronic communication links. For example, such electronic communication links may be established, at least in part, via the network/communication infrastructure 102 of FIG. 1 such as the Internet and/or other networks. It will be appreciated that this is not intended to be limiting, and that the scope of this disclosure includes implementations in which computing platform 1602, remote platform 1620, and/or external resources 1622 may be operatively linked via some other communication media. A residential charger 1618 may comprise a universal energy flow manager having an ability to connect to multiple energy sources through an application specific hardware as herein and may be portable. The residential charger may be used in any location that has a conventional grid supply to augment the available energy/power that may otherwise be limited when relying on grid power.

A given remote platform 1620 may include one or more processors configured to execute computer program modules. The computer program modules may be configured to enable an expert or user associated with the given remote platform 1620 to interface with system 1600 and/or external resources 1622, and/or provide other functionality attributed herein to remote platform 1620. By way of non-limiting example, a given remote platform 1620 and/or a given computing platform 1602 may be a server but may alternatively comprise one or more of a desktop computer, a laptop computer, a handheld computer, a tablet computing platform, a NetBook, a Smartphone, a gaming console, and/or other computing platforms.

External resources 1622 may include sources of information outside of system 1600, external entities participating with system 1600, and/or other resources. In some implementations, some or all of the functionality attributed herein to external resources 1622 may be provided by resources included in system 1600.

Computing platform 1602 may include electronic storage unit 108, one or more processors 1604, and/or other components. Computing platform 1602 may include communication lines, or ports to enable the exchange of information with a network and/or other computing platforms. Illustration of computing platform 1602 in FIG. 16 is not intended to be limiting. Computing platform 1602 may include a plurality of hardware, software, and/or firmware components operating together to provide the functionality attributed herein to computing platform 1602. For example, computing platform 1602 may be implemented by a cloud of computing platforms operating together as computing platform 1602.

Storage unit 108 may comprise non-transitory storage media that electronically stores information. The electronic storage media of storage unit 108 may include one or both of system storage that is provided integrally (i.e., substantially non-removable) with computing platform 1602 and/or removable storage that is removably connectable to computing platform 1602 via, for example, a port (e.g., a USB port, a firewire port, etc.) or a drive (e.g., a disk drive, etc.). Electronic storage unit 108 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 130 may include one or more virtual storage resources (e.g., cloud storage, a virtual private network, and/or other virtual storage resources). Storage unit 108 may store software algorithms, information determined by processor information received from computing platform 1602, information received from remote platform 1620, and/or other information that enables computing platform 1602 to function as described herein.

Processor 1604 may be configured to provide information processing capabilities in computing platform 1602. As such, processor 1604 may include one or more of a digital processor, an analog processor, a digital circuit designed to process information, an analog circuit designed to process information, a state machine, and/or other mechanisms for electronically processing information. Although processor 1604 is shown in FIG. 16 as a single entity, this is for illustrative purposes only. In some implementations, processor 1604 may include a plurality of processing units. These processing units may be physically located within the same device, or processor 1604 may represent processing functionality of a plurality of devices operating in coordination. Processor 1604 may be configured to execute one or more of charge hailing module 1608, charge reporting module 1610, constraints analysis module 1612, presentation module 1614, charging module 1616. Processor 1604 may be configured to execute the modules by software; hardware; firmware; some combination of software, hardware, and/or firmware; and/or other mechanisms for configuring processing capabilities on processor 1604. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 1608, 1610, 1612, 1614, and/or 1616 are illustrated in FIG. 16 as being implemented within a single processing unit, in implementations in which processor 1604 includes multiple processing units, one or more of modules 1608, 1610, 1612, 1614, and/or 1616 may be implemented remotely from the other modules. The description of the functionality provided by the different modules 1608, 1610, 1612, 1614, and/or 1616 described below is for illustrative purposes, and is not intended to be limiting, as any of modules 1608, 1610, 1612, 1614, and/or 1616 may provide more or less functionality than is described. For example, one or more of modules 1608, 1610, 1612, 1614, and/or 1616 may be eliminated, and some or all of its functionality may be provided by other ones of modules 1608, 1610, 1612, 1614, and/or 1616. As another example, processor 1604 may be configured to execute one or more additional modules that may perform some or all of the functionality attributed below to one of modules 1608, 1610, 1612, 1614, and/or 1616.

Figure 17:
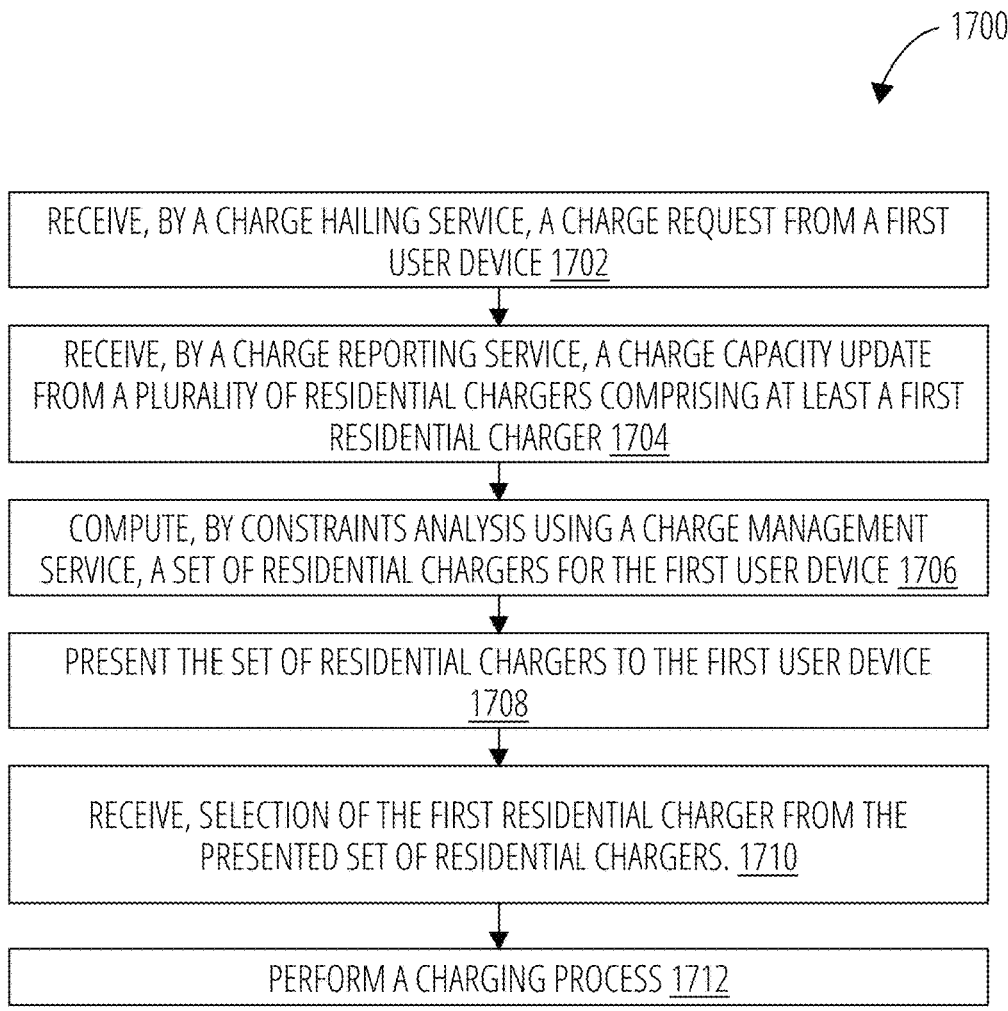
FIG. 17 depicts a flowchart of a process in which illustrative embodiments may be implemented.

FIG. 17 illustrates a process for hailing a charge for an electric vehicle in accordance with one or more implementations. The operations of process 1700 presented below are intended to be illustrative. In some implementations, process 1700 may be accomplished with one or more additional operations not described, and/or without one or more of the operations discussed Process 1700 may begin at step 1702 by receiving, by a charge hailing service of the charge hailing module 1608, a charge request from a first user device. In some implementations, the charge request may include at least a measure of an amount of charge required for an electric vehicle 132. The user device may be, for example, a personal mobile device or a dashboard of an electric vehicle. In step 1704, process 1700 may receive, by a charge reporting service, a charge capacity update from a plurality of residential chargers comprising at least a first residential charger. In step 1706, process 1700 may compute, by constraints analysis using a charge management service, a set of residential chargers for the first user device. In step 1708, process 1700 may present, by a presentation service the set of residential chargers to the first user device. In step 1710, process 1700 may receive, selection of the first residential charger from the presented set of residential chargers. The selection may be made by the EV operator or may be made automatically based on finding a charger that best fits the EV operator's constraints. A charging procedure may be performed afterwards in step 1712.

In an aspect, process 1700 may comprise DC fast charging a first electric vehicle by the first residential charger. The process 1700 may also comprise DC fast charging a plurality of electric vehicles by the first residential charger based on allocating, by the charge management service, a plurality of first user devices to the same residential charger. In some implementations, the residential chargers 1618 may provide level 3 charging power of more than 15 kW, for example, more than 20 kW or more than 50 kW or between 20 kW-200 kW or between 40 kW to 150 kW or a voltage of between 400V-900V with a charging speed of 3 to 20 miles per minute.

In another aspect, the first user device may be operated by a user of the first electric vehicle and the first residential charger may be operated by an owner of the first residential charger.

The process 1700 may perform the constraints analysis, for example, by performing a computation of the set of residential chargers that meet a DC Fast charging requirement. Thus, real time charge parameter information about the residential chargers may be used for the constraints analysis. Information about the charge parameter information electric vehicle and the electric vehicle owner may also be used for the constraints analysis as needed. In an aspect, the constraints analysis may include performing a computation of a likelihood to a arrive at a residential charger before a time limit or charge depletion threshold is reached.

The process 1700 may further comprise receiving, by the charge management service of the charge management module 1624, and responsive to receiving selection of the first residential charger, acceptance of said selection from the first residential charger, and automatically transmitting, by the charge management service a location of the first residential charger to the first user device. The first electric vehicle of the user device may be transported to said location for charging. In an aspect, the location may be obtained by triangulation.

In other implementations, the process may include receiving, by the charge management service, and responsive to receiving selection of the first residential charger, acceptance of said selection from the first residential charger, and automatically transmitting, by the charge management service a location of the first user device to the first residential charger. Herein the first residential charger may be transported to the electric vehicle for charging. This may be especially useful in situations where the electric vehicle has depleted energy and is immobile. The charge management service may also receive the location automatically or by triangulation.

Further, by the use of a universal energy flow manager 126 able to communicate with a plurality of application specific hardware 114, an electric vehicle load may be charged by another electric vehicle acting as a source. Even further, the low voltage DC Bus 514 may be utilized to directly or indirectly provide low voltage DC fast charging to appliances as needed. Thus, any amount of power needed may be provided by the charge hailing services by configuring the residential charger with enough energy sources to meet the demand.

Figure 18:
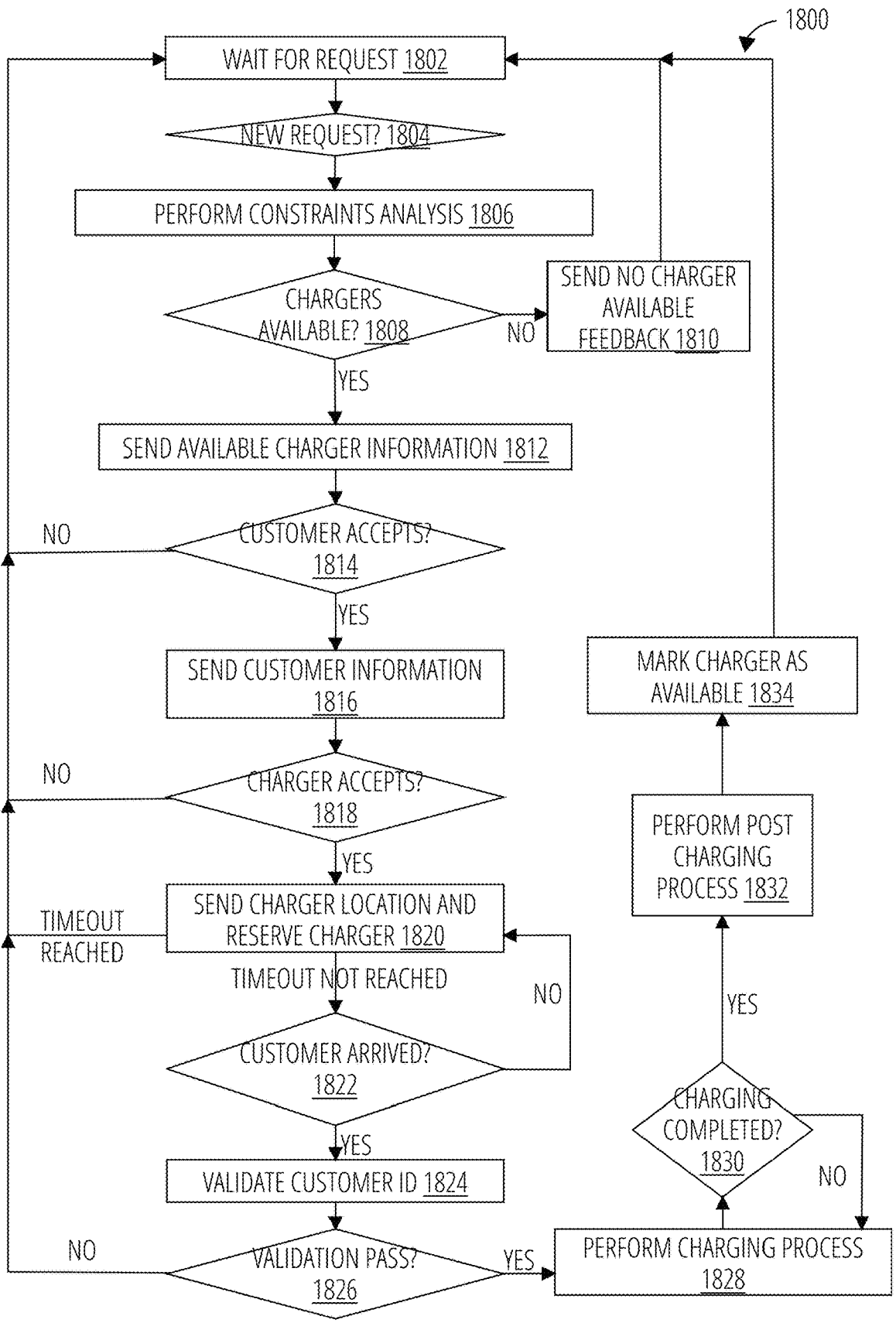
FIG. 18 depicts a flowchart of a cloud charge hailing process in which illustrative embodiments may be implemented.

Turning now to FIG. 18, a cloud charge hailing process 1800 is shown. The process may illustrate a charge hailing process managed from a server according to an illustrative embodiment. Charge management module 1624 may perform at least some of the server processes. The process may begin at step 1802, wherein the process 1800 may wait for a request for charge from a client. In step 1804, the process 1800 may determine a new request for charge and may perform, in step 1806, constraints analysis based on input comprising client/customer/EV charging parameters and residential charger status parameters.

Upon determining, in step 1808, that chargers that meet the request are available the process may send, in step 1812, the charger information to the client. This information may be stripped of location data for privacy. However, should there be no chargers available, the process 1800 may send a no charger available feedback to the client in step 1810 and wait for another request.

In step 1814, the process may determine that a client has selected a charger. The selection may be automatic or manual. In step 1816, the process may transmit the client information to the residential charger 1618 for manual or automatic acceptance. The acceptance may be based on a reliability score, for example, a rating of the client. In step 1818, the process may determine that the charger has accepted the client for a future charge procedure. In step 1820, process 1800 may transmit the charger location to the client and may reserve charger for a defined timeout period. In step 1822, the process 1800 may determine that the client has arrived within the timeout period and may then validate in step 1824, based on predefined validation logic, an identification of the client.

Upon a validation pass in step 1826, process 1800 may instruct the residential charger 1618 to perform a charging process in step 1828 to meet the client request. When completed (step 1830), a post charging operation may be performed in step 1832. This may comprise, for example, paying a cost of the charging operation and/or rating the client or charger. In step 1834, the charger may be marked as available, and the process may start over.

Figure 19:
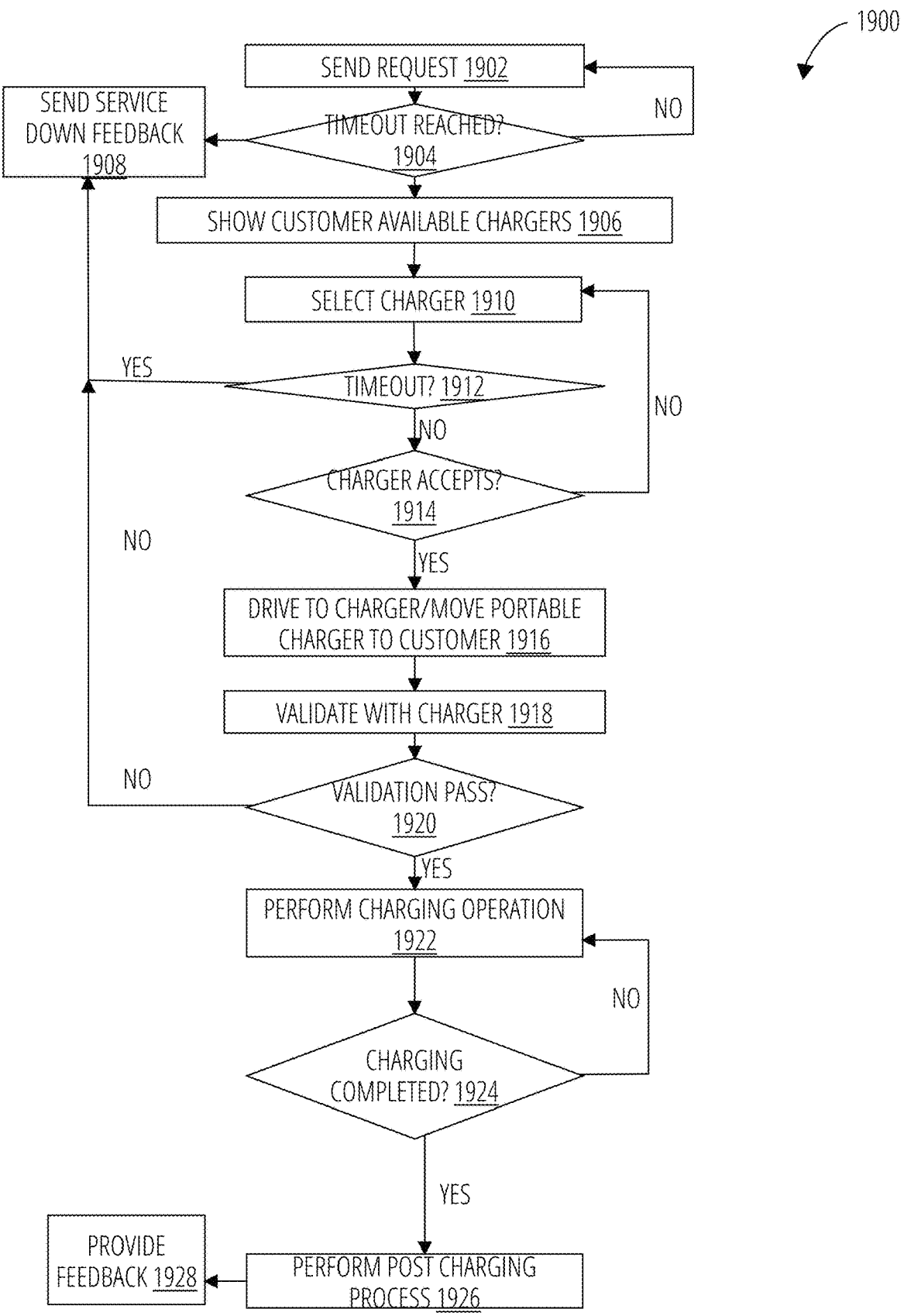
FIG. 19 depicts a flowchart of an electric vehicle charge hailing process in which illustrative embodiments may be implemented.

FIG. 19 illustrates an electric vehicle charge hailing process 1900 which may be performed from a client device such as a personal mobile phone and/or an EV dashboard. Of course, the process is illustrative and is not meant to be limiting. Other similar processes may be possible in view of the descriptions herein. The electric vehicle charge hailing process 1900 may begin at step 1902, wherein the client may transmit a charging request. Upon determining that a defined timeout period has been reached (step 1904), the client may be notified of the service being unavailable (step 1908). The client may however be presented with a set of residential chargers 1618, in step 1906, that may meet the demands of the charging request. The client may select a charger from the set of residential chargers in step 1910 and the selected charger may accept the proposed charging service in step 1914 within a timeout period (step 1912). Acceptance by the selected charger may be based on, for example, a reliability score of the client.

In step 1916, the EV may be transported to the selected charger for a charging operation. In some embodiments however, the charger may be a portable charger and may be transported to the client for a charging operation. In step 1918, the process 1900 performs a validation operation in step 1920 to validate the client and or selected charger. This may be performed, for example, by an inspection of client and/or residential charger ID (identification). Upon passing the validation, the charging operation may be performed in step 1922 until completion in step 1924 In step 1926, the process may perform a post charging operation and an optional feedback operation in step 1928.

Figure 20:
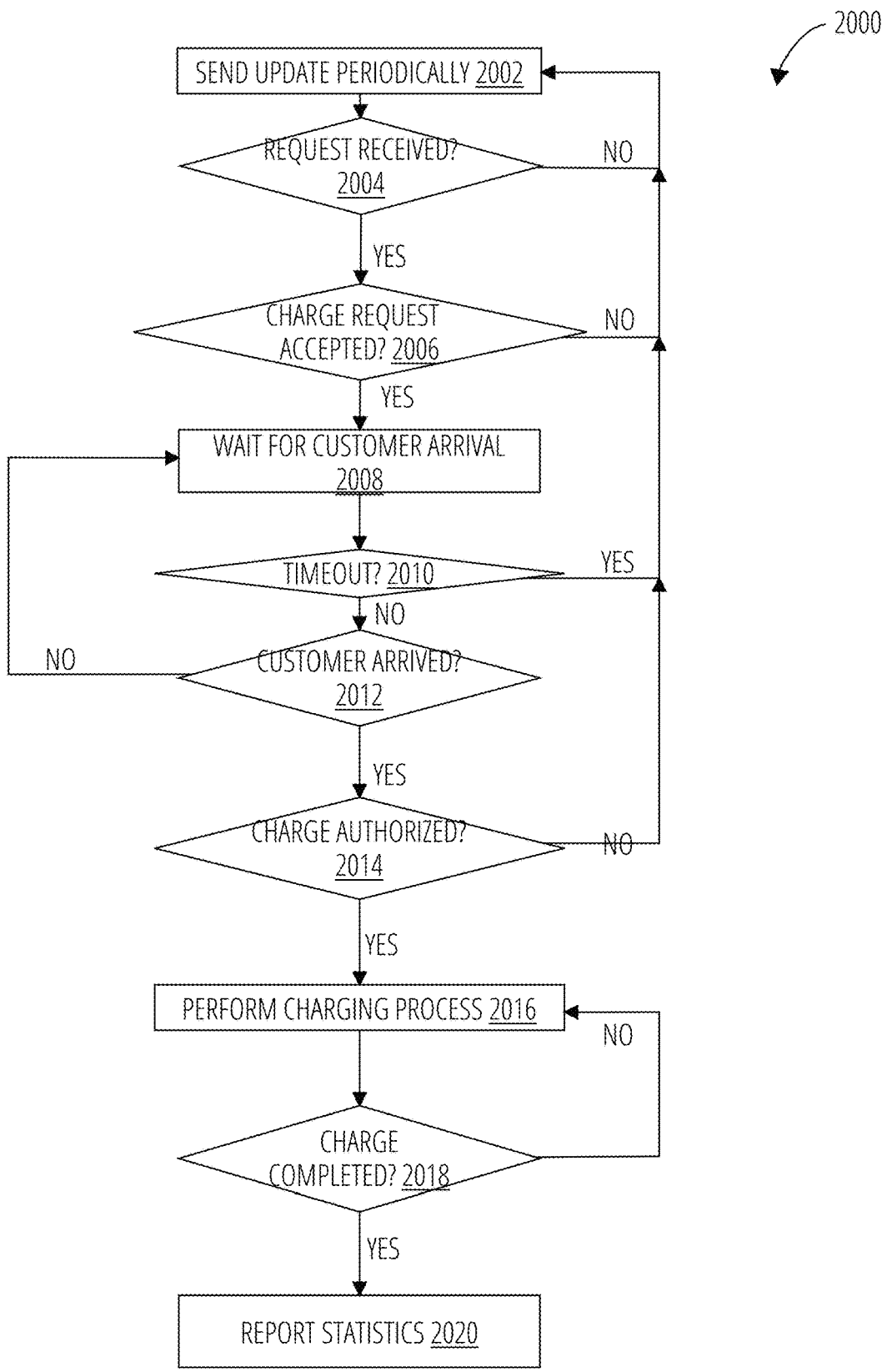
FIG. 20 depicts a flowchart of a residential charge hailing process in which illustrative embodiments may be implemented.

FIG. 20 illustrates an example residential charge hailing process 2000 which may be performed from a residential charger 1618. The process may begin at step 2002 wherein the process 2000 may transmit at regular time intervals (for example, every 1 second or every 30 seconds) an update about a residential charger parameter status, including for example, a total number of connected energy sources and corresponding energy parameters and owner preferences. Upon receiving a request for charge in step 2004, the process may automatically or manually accept, in step 2006, the request based on for example, a reliability score of the client associated with the request. The process 2000 may wait in step 2008 for defined timeout period (step 2010) until the client arrives in step 2012. Of source, in some embodiment, the charger may be transported to the client.

In step 2014, the process 2000 may validate the charging process to determine if charging is authorized and the charging operation may be performed in step 2016 upon passing the validation. When the charge is completed in step 2018, statistics of the charge may be reported back to the server, step 2020.

Thus, a computer-implemented method, system or apparatus, and computer program product are provided in the illustrative embodiments for intelligent power delivery proposals and other related features, functions, or operations. Where an embodiment of a portion thereof is described with respect to a type of device, the computer-implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail) or other light-weight client-applications. The user does not manage or control the underlying cloud infrastructure, including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present disclosure may be a system, a method, and/or a computer program product at any possible technical detail level of integration. The computer program product may include the computer-readable storage medium (or media) having the computer readable program instructions thereon for causing a processor to carry out aspects of the present disclosure.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, including but not limited to computer-readable storage devices as used herein, is not to be construed as being transitory signals per se, such as radio waves or other freely propagating electromagnetic waves, electromagnetic waves propagating through a waveguide, or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer-readable program instructions for storage in a computer-readable storage medium within the respective computing/processing device.

The computer-readable program instructions for carrying out operations of the present disclosure may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object-oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer, and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, to perform aspects of the present disclosure.

Aspects of the present disclosure are described herein concerning flowchart illustrations and/or block diagrams of methods, apparatus (systems), and computer program products according to embodiments of the disclosure. It will be understood that computer readable program instructions can implement each block of the flowchart illustrations and/or block diagrams and combinations of blocks in the flowchart illustrations and/or block diagrams.

These computer-readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other devices to cause a series of operational steps to be performed on the computer, other programmable apparatus or other devices to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
    receiving an energy demand state of one or more coupled electrical loads coupled to a universal energy flow manager via a load application specific hardware (load ASH), the energy demand state being indicative of a desired amount of energy needed by the one or more coupled electrical loads in an energy management environment;
    receiving an available energy state of one or more coupled energy sources coupled to the universal energy flow manager via a source application specific hardware (source ASH), the available energy state being indicative of an available amount of energy from the one or more coupled energy sources in the energy management environment;
    generating input data using at least the energy demand and available energy states;
    extracting one or more features from the input data, the one or more features representative of a characteristic of a request for a power delivery proposal operation,
    proposing, using a power delivery module, at least one power delivery proposal for the one or more coupled electrical loads;
    and performing a power delivery operation based on the power delivery proposal.

2. The computer-implemented method of claim 1, wherein the power delivery module is a machine learning engine.

3. The computer-implemented method of claim 1, further comprising:
    performing the power delivery operation through a load ASH of the one or more coupled electrical loads.

4. The computer-implemented method of claim 3, wherein the power delivery operation is performed automatically.

5. The computer-implemented method of claim 1, further comprising:
    generating, by attributes prioritization, a set of attributes of the energy management environment to enforce; and
    proposing the at least one power delivery proposal based on one or more attributes of the set of attributes.

6. The computer-implemented method of claim 5, wherein the attributes include an attribute selected from the list consisting of minimizing utility cost, minimizing charging time, maximizing availability of backup energy, maximize excess energy sales, and maximizing battery life.

7. The computer-implemented method of claim 1, wherein the power delivery proposal comprises instructions to perform a DC fast charge or one or more electric vehicles.

8. The computer-implemented method of claim 1, wherein the power delivery proposal comprises instructions to maximize use of renewable energy sources during a defined time interval.

9. The computer-implemented method of claim 1, wherein the power delivery proposal is provided in real time.

10. The computer-implemented method of claim 1, wherein the power delivery proposal comprises load shedding instructions.

11. The computer-implemented method of claim 1, wherein the power delivery proposal comprises powering a plurality of loads by time division multiplexing of load source pairs.

12. The computer-implemented method of claim 1, wherein the input data further comprise data selected from the list consisting of historical device use data, a fast charging requirement, a weather forecast, a calendar data, a current electricity consumption demand, a vehicle energy demand profile, a home energy demand profile, and a battery lifetime.

13. The computer-implemented method of claim 1, further comprising:
    providing feedback for the power delivery module indicative of an accuracy of proposals to reinforce the power delivery module.

14. The computer-implemented method of claim 1, further comprising:
providing the power delivery proposal in real time.

15. A computer system comprising a processor configured to:
receive an energy demand state of one or more coupled electrical loads coupled to a universal energy flow manager via a load application specific hardware (load ASH), the energy demand state being indicative of a desired amount of energy needed by the one or more coupled electrical loads in an energy management environment;
receive an available energy state of one or more coupled energy sources coupled to the universal energy flow manager via a source application specific hardware (source ASH), the available energy state being indicative of an available amount of energy from the one or more coupled energy sources in the energy management environment;
generate input data using at least the energy demand and available energy states;
extract one or more features from the input data, the one or more features representative of a characteristic of a request for a power delivery proposal operation,
propose, using a power delivery module, at least one power delivery proposal for the one or more coupled electrical loads;
and perform a power delivery operation based on the power delivery proposal.

16. A non-transitory computer-readable storage medium storing a program which, when executed by a computer system, causes the computer system to:
receive an energy demand state of one or more coupled electrical loads coupled to a universal energy flow manager via a load application specific hardware (load ASH), the energy demand state being indicative of a desired amount of energy needed by the one or more coupled electrical loads in an energy management environment;
receive an available energy state of one or more coupled energy sources coupled to the universal energy flow manager via a source application specific hardware (source ASH), the available energy state being indicative of an available amount of energy from the one ore one or more coupled energy sources in the energy management environment;
generate input data using at least the energy demand and available energy states;
extract one or more features from the input data, the one or more features representative of a characteristic of a request for a power delivery proposal operation,
propose, using a power delivery module, at least one power delivery proposal for the one or more coupled electrical loads;
and perform a power delivery operation based on the power delivery proposal.

* * * * *